(12) United States Patent
Ikeda

(10) Patent No.: US 6,557,963 B1
(45) Date of Patent: May 6, 2003

(54) COLOR IMAGE COMMUNICATION APPARATUS

(75) Inventor: Atsushi Ikeda, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/656,064

(22) Filed: Sep. 6, 2000

(30) Foreign Application Priority Data

Sep. 7, 1999 (JP) .......................................... 11-252966

(51) Int. Cl.[7] .............................................. B41J 29/38
(52) U.S. Cl. ..................................................... 347/14
(58) Field of Search .......................... 347/214, 43, 3, 347/183; 400/120, 703, 605, 708; 358/401, 1.14, 471, 472, 498

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/140 R |
| 4,558,333 A | 12/1985 | Sugitani et al. | 346/140 R |
| 4,723,129 A | 2/1988 | Endo et al. | 346/1.1 |
| 4,740,796 A | 4/1988 | Endo et al. | 346/1.1 |
| 5,274,395 A * | 12/1993 | Mizoguchi et al. | 347/183 |
| 5,751,449 A * | 5/1998 | Nobuta | 358/498 |
| 6,164,740 A * | 12/2000 | Hirai et al. | 347/3 |
| 6,195,170 B1 * | 2/2001 | Mizutani et al. | 358/1.14 |

FOREIGN PATENT DOCUMENTS

| | | |
|---|---|---|
| JP | 54-56847 | 5/1979 |
| JP | 59-123670 | 7/1984 |
| JP | 59-138461 | 8/1984 |
| JP | 60-71260 | 4/1985 |

* cited by examiner

Primary Examiner—N. Le
Assistant Examiner—K. Feggins
(74) Attorney, Agent, or Firm—Fitzpatrick, Cella, Harper & Scinto

(57) ABSTRACT

In a color facsimile apparatus capable of receiving a monochrome image and a color image, a monochrome image printing cartridge, a general color image printing cartridge and a photograph image printing cartridge can be selectively installed in a printing unit. When the kind of received image does not correspond to the kind of installed cartridge, the received image is stored in a memory, and a warning is given to a user. Further, when recording of the received image is forcedly performed based on a user's instruction even in this case, the user is inquired whether or not the image stored in the memory is to be deleted.

17 Claims, 15 Drawing Sheets

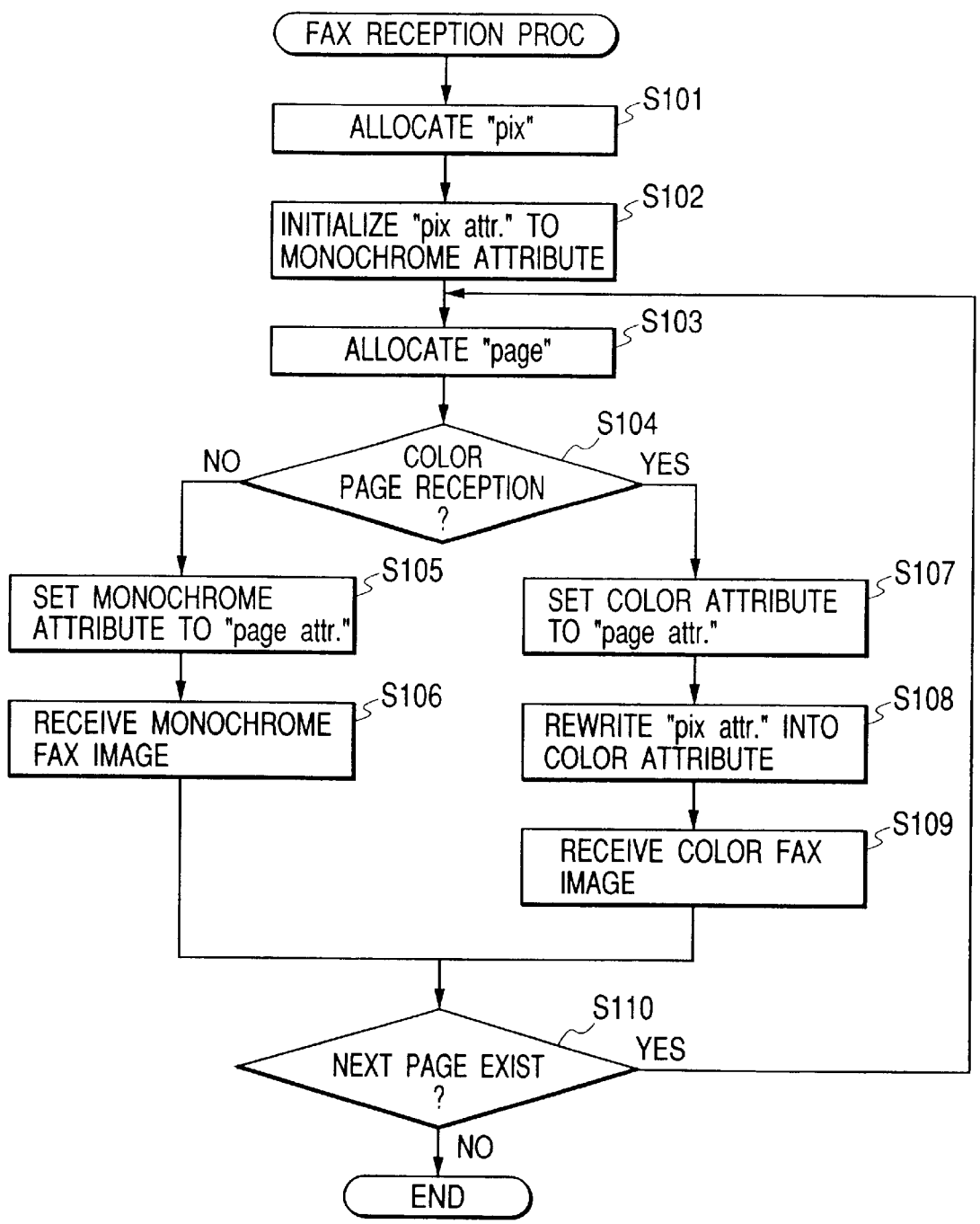

COLOR IMAGE COMMUNICATION APPARATUS

BACKGROUND OF THE INVENTION

1. Field of the Invention

The present invention relates to a color image communication apparatus which contains a recording unit capable of receiving a monochrome image and a color image and performing recording of the received image.

2. Related Background Art

Conventionally, there has been an apparatus which can perform binary monochrome facsimile transmission based on a facsimile transmission procedure according to T.30 Standard by ITU-T (International Telecommunication Union—Telecommunication Standardization Sector) and also perform color facsimile transmission according to an independent procedure.

Further, in recent years, a color facsimile transmission procedure has been standardized by ITU-T.

Thus, also an apparatus which can perform the monochrome and color facsimile transmission based on the standardized facsimile transmission procedures has been proposed.

On the other hand, for example, in some inkjet-system printers which are applicable as a recording unit of a facsimile apparatus, a user can select one of plural kinds of cartridges such as a monochrome cartridge, a color cartridge, a color cartridge for photograph recording (called a photograph recording color cartridge hereinafter), and the like. The monochrome cartridge is dedicated for monochrome recording. The color cartridge contains yellow, magenta and cyan inks in addition to a monochrome ink, and thus can perform the monochrome recording and color recording. In the photograph recording color cartridge, the composition of the contained ink is minute so as to be able to more clearly record a photograph image and the like.

However, conventionally, treatment to be performed when the kind of received image does not correspond to the cartridge for the recording is insufficient. For example, in spite of the kind of received image and the kind of cartridge, the received image is forcedly output by using the cartridge installed at that time.

Further, in an apparatus for SOHO (Small Office, Home Office) or the like, in a case where it is difficult to judge whether the received image to be selected and printed is a color image or a monochrome image because a display function of a used LCD (liquid crystal display) or the like is comparatively poor, if a user gets it into his head that the color cartridge has been installed, an unnecessary monochrome image is output by using this color cartridge.

Further, when the photograph recording color cartridge which is expensive as compared with the ordinary color cartridge is installed, there is some fear that a monochrome facsimile image is carelessly recorded with expensive ink.

Further, there is an at-home apparatus which does not have such a function as above for causing a user to select an arbitrary image and recording/deleting the selected image, because of the reason for a memory capacity and the like. In this case, when the color facsimile image is received in the state that the monochrome cartridge is being installed, the received color image can not be output as long as the monochrome cartridge is not exchanged to the color cartridge, whereby the received image occupies the memory until it is recorded.

Further, there is a case where, when the color image is received, the received image is temporarily preview-printed because it is not known whether or not the received image is to be printed actually as a color image, and if necessary the received image is again printed as the color image. In such the case, if the received data is automatically deleted after it was recorded as the monochrome image, there is a problem that the actual printing can not be performed when it is judged later that the color printing to the received data is necessary.

SUMMARY OF THE INVENTION

An object of the present invention is to provide a color image communication apparatus which solved such drawbacks as above and a control method for this color image communication apparatus.

Another object of the present invention is to provide a color image communication apparatus which can perform appropriate recording of an automatically received image according to a kind of received image, a capability of a recording unit and a user's wish, and a control method for this color image communication apparatus.

Still another object of the present invention is to provide a color image communication apparatus which can perform preview printing of a received image irrespective of a capability of a recording unit, and a control method for this color image communication apparatus.

Still another object of the present invention is to provide a color image process apparatus which compares a kind of cartridge installed in a recording unit with a kind of received image, makes an inquiry to a user if necessary, controls continuation of later recording on the basis of a result of the inquiry and thus improves operability, and a control method for this color image process apparatus.

Other objects and features of the present invention will become apparent from the following detailed description and the attached drawings.

BRIEF DESCRIPTION OF THE DRAWINGS

FIG. 8 is a flow chart showing a scheme of a facsimile reception process;

DETAILED DESCRIPTION OF THE PREFERRED EMBODIMENTS

First Embodiment

Hereinafter, the embodiment of the present invention will be explained in detail with reference to the attached drawings.

Figure 1:
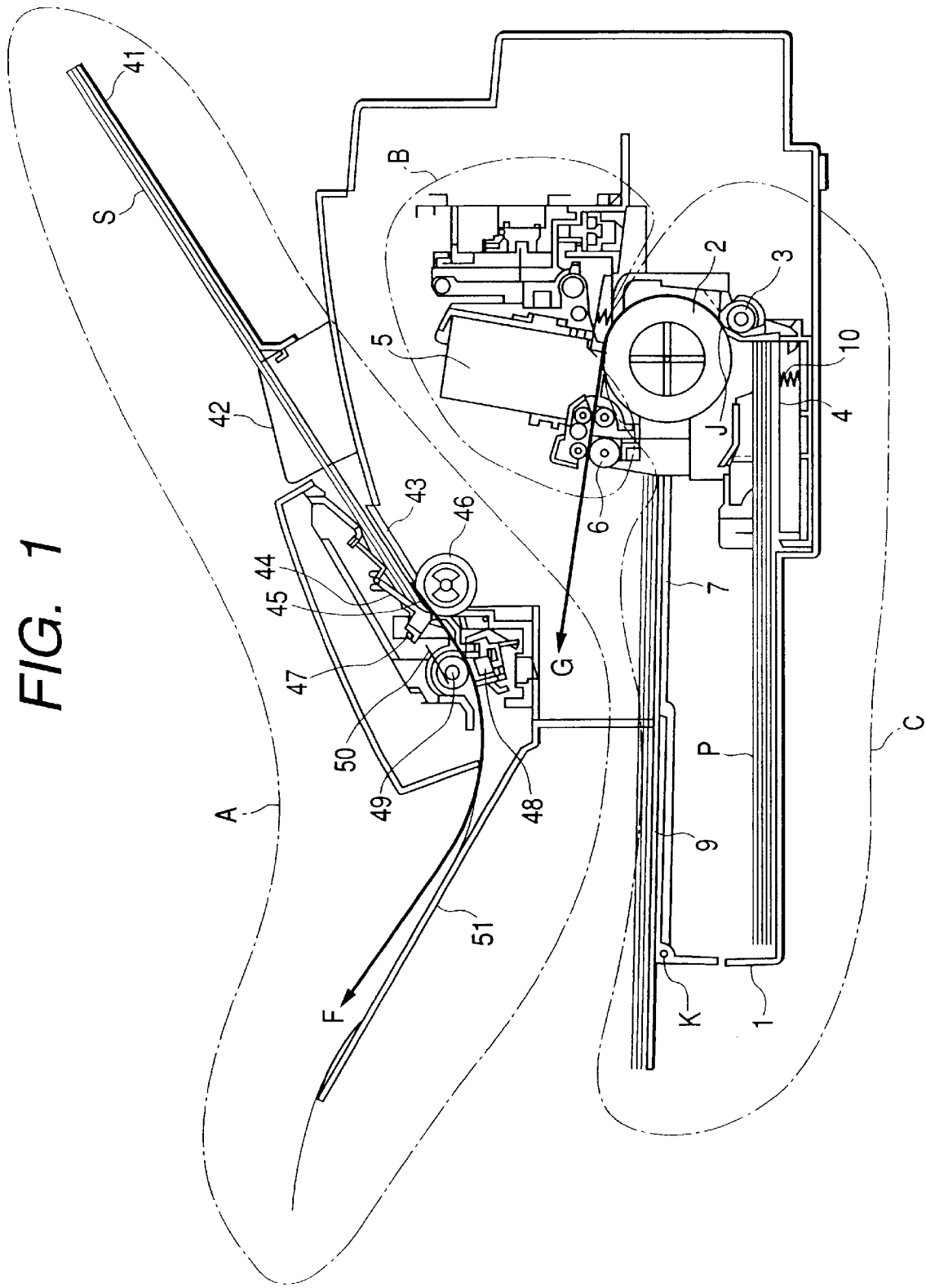
FIG. 1 is a sectional view showing a structure of a facsimile apparatus which contains a recording unit to perform recording by using a recording head of inkjet system according to the embodiment of the present invention.

FIG. 1 is a sectional view showing a structure of a facsimile apparatus which contains a recording unit to perform recording by using a recording head of inkjet system. This facsimile apparatus can transmit and receive monochrome facsimile data and color facsimile data.

The schematic structure of the facsimile apparatus will be explained with reference to FIG. 1. In FIG. 1, symbol A denotes a reading unit (or part) which optically reads an original, symbol B denotes a recording unit (or part) which performs the recording according to the inkjet system, and symbol C denotes a sheet feed unit (or part) which separates one by one a recording medium such as a recording sheet P or the like stacked in a sheet feed cassette and feds the separated recording medium to the recording unit B.

First, a flow of the recording sheet P will be explained. The carrying path of the recording sheet P is indicated by an arrow G. Namely, the recording sheet P stacked on a sheet feed cassette 1 of the sheet feed unit C is picked up by a sheet feed roller 2 and a retard roller 3, and carried to the recording unit B by the sheet feed roller 2. In the recording unit B, ink is ejected from a recording head 5 to the recording sheet P to perform the recording, and the recording sheet P is carried according to the recording. When the recording ends, the recording sheet P is discharged by a sheet-discharge roller 6 and stacked on a sheet discharge stacker 7.

Next, the concrete structure of the sheet feed unit C will be explained.

In FIG. 1, the plural recording sheets P are stacked and held in the sheet feed cassette 1, and an intermediate board 4 on which the sheets P are actually stacked is provided in the cassette 1. The back face of the intermediate board 4 is forced upward by an intermediate board spring 10 arranged oppositely to the sheet feed roller 2. In a sheet feed standby state, the intermediate board 4 is forced downward by a cam or the like such that the recording sheets P can be easily added when the sheets P waste or have gone.

On the other hand, when a recording instruction signal is detected and thus a sheet feed operation is started, the downward forcing to the intermediate board 4 by the cam or the like is released, whereby the recording sheet P is picked up by the sheet feed roller 2. The retard roller 3 which is opposite to the sheet feed roller 2 cooperates with the intermediate board 4 to change the position of the recording sheet P. When the sheet feed operation is performed, only the uppermost one of the recording sheets P forced by the intermediate board 4 is separately picked up and carried by the sheet feed roller 2 at a unit (or part) J. The separated and carried sheet P is sandwiched between the sheet feed roller 2 and the retard roller 3 such that the sheet P is sufficiently wound around the roller 2 and carried to the recording unit B.

Further, a discharge mechanism for the recording sheet P which was subjected to the recording by the recording unit B will be explained.

The recording sheets P discharged by the sheet discharge roller 6 are stacked on the sheet discharge stacker 7. A sheet discharge auxiliary tray 9 which is rotatable around a hinge K unit is provided on the sheet discharge stacker 7. When the used recording sheet P is a long-sized sheet, the sheet discharge stacker can be prolonged in the recording sheet discharge direction by rotating the auxiliary tray 9. Further, the stacker 7 also acts as the cover of the sheet feed cassette 1. Since plural ribs (not shown) are provided on the sheet discharge stacker 7 and the sheet discharge auxiliary tray 9, the recording sheets P subjected to the recording are carried and sequentially stacked on these ribs.

Further, a flow of an image original S will be explained.

The original carrying path is indicated by an arrow F in FIG. 1. In FIG. 1, the image originals S are stacked on an original stacking tray 41 with their image-formed faces facedown. The image originals S stacked on the original stacking tray 41 are positioned by a slider 42 which can be moved in the width direction of the original. When the image original S is stacked on the original stacking tray 41, the stacked original is pressed down by an auxiliary carrying spring 44 on an auxiliary carrying pressure member 43, and managed and preparatively carried by cooperation of a separation roller 46.

Next, the preparatively carried image originals S are then separated and carried one by one, from the downmost original, by cooperation of a separation member 45 and the separation roller 46 pressed down by an ADF (automatic document feeder) spring 47. Also, the separation roller 46 functions to carrying the separated image original S to the reading position. An image which was made on the image original S separated and carried to the reading position by the separation roller 46 is read by a photoelectric conversion sensor 48. A CS roller 49 is pressed down by a CS pressure spring 50 along the reading line of the photoelectric conversion sensor 48, whereby the separated and carried image original S is closely contacted with the reading line. Also, the CS roller 49 functions to determine a reading speed of the image original S in a sub-scan direction (i.e., an image original carrying direction) and discharge the image original S in which the reading ended. Finally, the discharged image originals S are stacked on an original discharge tray 51. The original discharge tray 51 is detachably installed in the body the apparatus.

Figure 2:
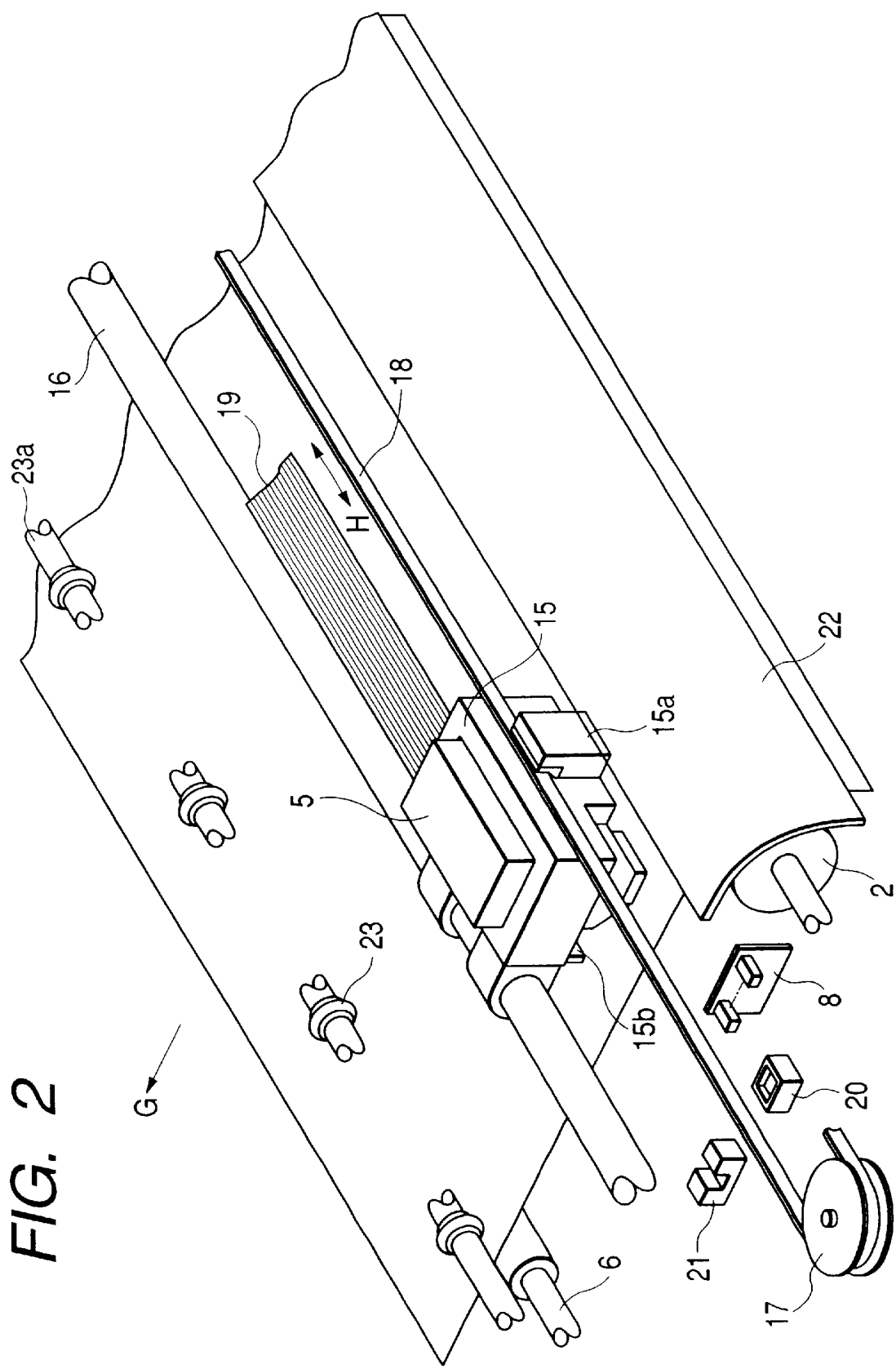
FIG. 2 is a perspective view showing a detailed structure of a recording unit B of the apparatus shown in FIG. 1.

FIG. 2 is a perspective view showing the detailed structure of the recording unit B. As shown in FIG. 2, the recording head 5 which contains an ink tank is the cartridge-type recording head. When ink has gone, the recording head itself is exchanged for a new recording head. In addition to the cartridge having such the structure as above, it is possible to use also a cartridge having a structure that, when ink has gone, only an ink tank is exchanged for a new ink tank.

Here, a principle of ink ejection from the recording head will be explained. Generally, this recording head contains a minute liquid outlet (i.e., an orifice), a liquid path, an energy operation unit which is provided at the part of the liquid path, and an energy generation unit which generates ink droplet formation energy acting on the liquid in the energy operation unit.

As the energy generation unit, it is possible to use a device which uses an electromechanical transducer such as a piezoelectric element, a device which irradiates an electromagnetic wave such as a laser beam to heat a liquid being there and ejects and flies droplets by such the heating, a device which heats and ejects a liquid by using an electrothermal transducer, or the like. Especially, in the recording head of the system to eject the liquid by thermal energy, the minute liquid outlets (the orifices) for ejecting the recording droplets and forming the flying droplets can be arranged in high density, whereby high-resolution recording can be achieved.

The recording head which uses the electrothermal transducer as the energy generation unit can be easily downsized as a whole. Further, in this recording head, the merit of IC technology that technological advancement and reliability improvement are remarkable in the recent semiconductor field and the merit of micromachining technology can be sufficiently used. Further, such the recording head can be easily prolonged and flattened (i.e., deformed two-dimensionally). For these reasons, it is possible to easily produce a multinozzle head and a high-density nozzle head, and also it is possible to achieve mass production of such heads and effectively lower manufacturing costs.

In such the recording head which is manufactured in a semiconductor manufacturing process by using the electrothermal transducer as the energy generation unit, generally the liquid path corresponding to each ink ejection outlet is provided, and also the electrothermal transducer which acts as the means for supplying thermal energy to the liquid in each liquid path and ejecting and forming the ink droplets through the corresponding ink ejection outlet is provided. In this structure, the liquid is supplied from a common liquid chamber which is connected to each liquid path.

Next, the structure of the recording unit B will be explained with reference to FIG. 2.

In FIG. 2, a carriage 15 is reciprocated along a direction (the main-scan direction indicated by an arrow H) perpendicular to the recording sheet P carrying direction (the sub-scan direction indicated by an arrow G) and accurately holds the recording head 5. Further, the carriage 15 is slidably held by a guide rod 16 and a butting unit 15a. The carriage 15 is reciprocated by a pulley 17 and a timing belt 18 which are driven by a carriage motor 30 (not shown in FIG. 2), and a recording signal and power given to the recording head 5 at this time are supplied from an electrical circuit of the body of the device through a flexible cable 19. The recording head 5 is connected to the flexible cable 19 through the respective contact points plugged in each other.

A cap 20 which is provided at the home position of the carriage 15 of the recording unit B functions as an ink reception means, and is moved up and down if necessary. When the cap 20 is moved up, it comes into closely contact with the recording head 5 to cover a nozzle unit thereof, thereby preventing ink evaporation and dust adhering.

In the recording unit B, a carriage home sensor 21 provided on the body of the apparatus and a shading board 15b provided on the carriage 15 are used such that the recording head 5 and the cap 20 are positioned to be relatively opposite to each other. A transparent photointerrupter is used as the carriage home sensor 21. When the carriage 15 is moved to the standby position, it is detected that the recording head 5 and the cap 20 are positioned to be relatively opposite to each other, by using that light irradiated from a part of the carriage home sensor 21 is shaded by the shading board 15b.

The recording sheet P is carried up in FIG. 2, bent horizontally by the sheet feed roller 2 and a sheet guide 22, and carried in the sub-scan direction indicated by the arrow G. The sheet feed roller 2 and the sheet discharge roller 6 are driven by a recording motor (not shown) to high-accurately carry the recording sheet P in the sub-scan direction if necessary, in cooperation with the reciprocation of the carriage 15. Plural rowels 23 which are made from high water-repellent material and come in contact with the recording sheet P only in the blade circumference part are arranged in the sub-scan direction. Each rowel 23 is arranged to be apart from the adjacent rowel by a predetermined length in the main-scan direction by means of a bearing member 23a. Thus, even if the rowel 23 comes into contact with the image not fixed yet on the recording sheet P immediately after the recording, the rowel 23 can guide and carry the recording sheet P without influencing such the image.

Figure 3:
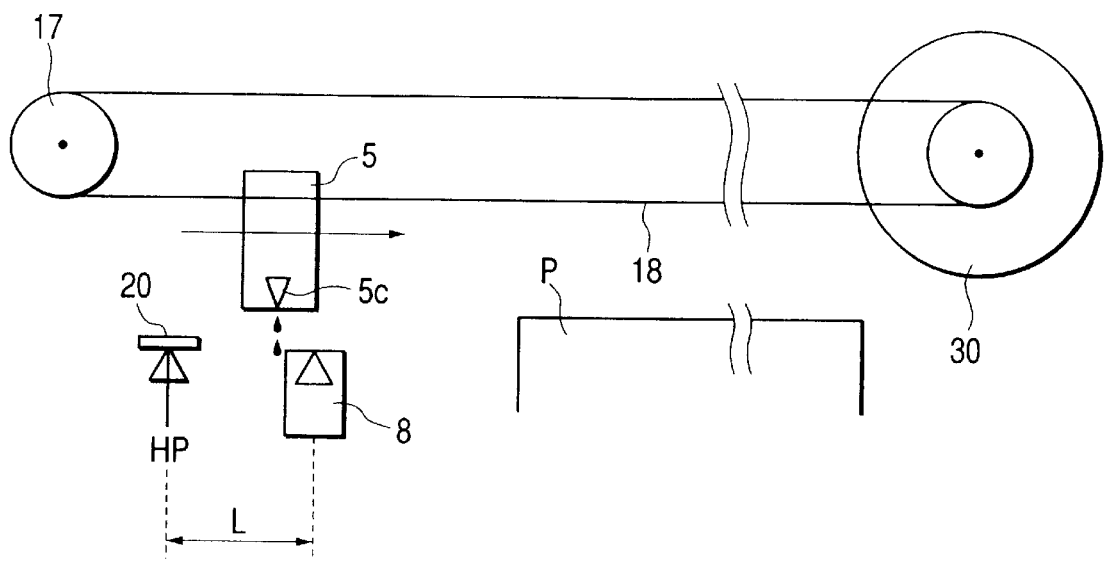
FIG. 3 is a block diagram showing a detailed structure of the periphery of a photosensor 8 contained in the recording unit B.

A photosensor 8 which is a transparent photointerrupter is disposed at the position opposite to a nozzle line 5c of the recording head 5, between the cap 20 and the edge of the recording sheet P, as shown in FIG. 3. Thus, the photosensor 8 directly and optically detects an ink droplet ejected from the nozzle of the recording head 5, whereby it is possible from the detected result that the ink of the recording head 5 has gone.

In the photosensor 8, an infrared LED is used as the light emission element, and a lens is incorporated with the light emission face of this infrared LED, whereby light can be irradiated to the light reception elements substantially in parallel. A phototransistor is used as the light reception element. On the light reception face of the light reception element, holes each having 0.7 mm×0.7 mm size are formed with the molding material on the optical axis. Thus, on the whole area between the light emission and reception elements, the detection range is narrowed to 0.7 mm in the height direction and 0.7 mm in the width direction. Further, the optical axis between the light emission and reception elements is arranged in parallel with the nozzle line 5c of the recording head 5, and the distance between the light emission and reception elements is set to be wider than the nozzle line 5c. When the position of the optical axis coincides with the position of the nozzle line 5c, the ink droplet ejected from each nozzle of the recording head 5 can pass the detection range between the light emission and reception elements. When the ink droplet passes the detection range, the light from the light emission side is shaded by this ink droplet, a quantity of the light to be emitted to the light reception side is thus decreased, whereby the output of the phototransistor acting as the light reception element is changed.

In order to position the nozzle line 5c of the recording head 5 and the photosensor 8 to be relatively opposite to each other, as well as the positioning of the cap 20, the carriage home sensor 21 provided on the body of the apparatus is used.

Figure 4:
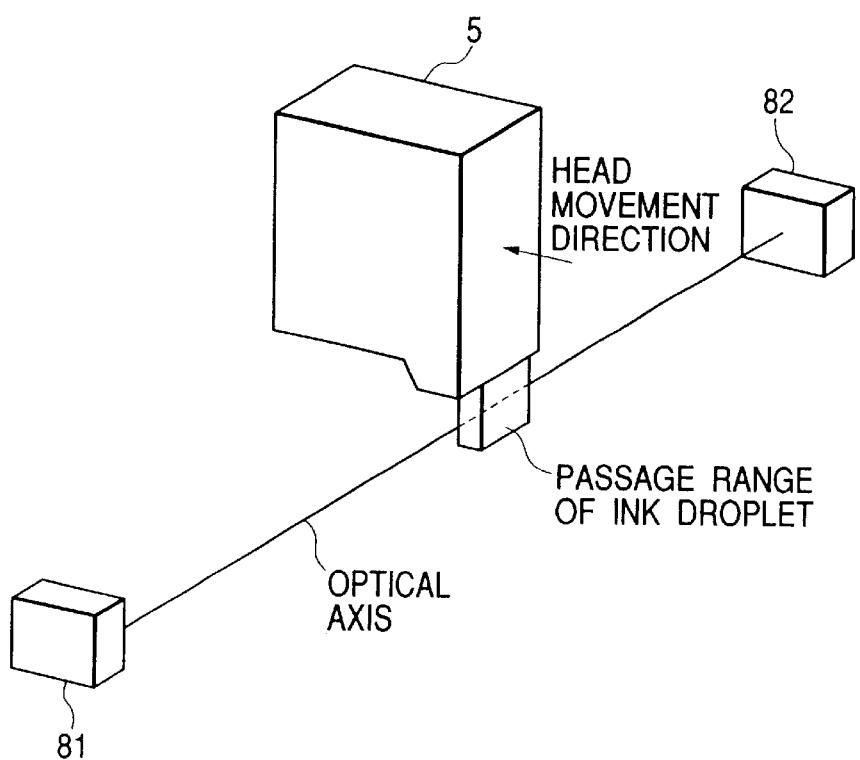
FIG. 4 is a perspective view showing a state that an optical axis of an infrared LED 81 being a light emission element of the photosensor 8 is interrupted by ink.

In the present embodiment, as shown in FIG. 3, the distance (L) which moves from the position of the nozzle line 5c of the recording head 5 in the home position (HP) to the optical axis of the photosensor 8 is converted into the number of steps of the motor which drives the carriage 15, the obtained result is set beforehand as a constant in a control program to execute the recording operation. Thus, by moving the carriage at a certain quantity after detecting the home position, it is possible to accurately position the nozzle line of the recording head 5 and the optical axis of the photosensor 8 to be relatively opposite to each other. Before the recording operation of one page is started, or after the recording operation of one page ended, the recording head 5 is moved nearby the photosensor 8, the ink is ejected such that the ejected ink droplet crosses the optical axis of an infrared LED 81 acting as the light emission element as shown in FIG. 4, whereby ink remainder quantity detection is performed. In the present embodiment, when the ejected ink droplet crosses the optical axis and thus shades the light reaching a phototransistor 82 acting as the light reception element of the photosensor 8, it is judged that the ink ejection is normally performed.

Figure 5:
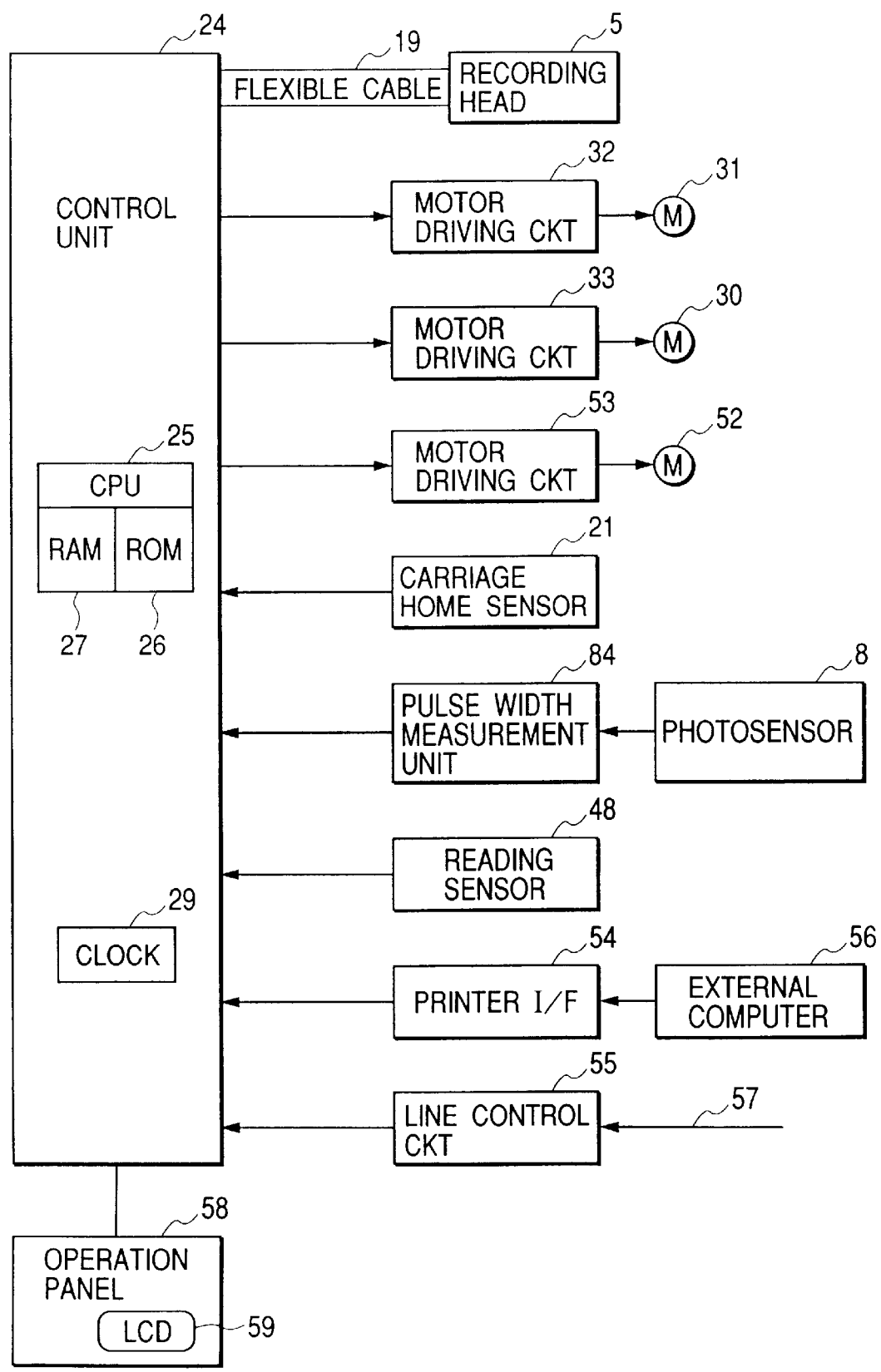
FIG. 5 is a block diagram showing a control structure of the facsimile apparatus shown in FIG. 1.

FIG. 5 is a block diagram showing the control structure of the facsimile apparatus shown in FIG. 1.

In FIG. 5, numeral 24 denotes a control unit which controls the apparatus as a whole. The control unit 24 contains a CPU 25, a ROM 26 which stores control programs and various data to be executed by the CPU 25, a RAM 27 which is used as a working area for various processes of the CPU 25 and temporarily stores the various data, and a clock 29.

As shown in FIG. 5, the recording head 5 is connected to the control unit 24 through the flexible cable 19. The flexible cable 19 includes a control signal line and an image signal line through which control and image signals are supplied from the control unit 24 to the recording head 5. The output of the photosensor 8 is converted into numerical data by an A/D converter, and the obtained numerical data can be analyzed by the CPU 25. A carriage motor 30 can be rotated on the basis of the number of pulse steps by a motor driving circuit 32. Further, the control unit 24 controls the carriage motor 30 through a motor driving circuit 33, a carrying motor 31 through the motor driving circuit 32, a reading motor 52 through a motor driving circuit 53, and inputs the output from the carriage home sensor 21.

Further, the control unit 24 is connected to image data input devices such as a reading sensor 48, a printer interface (I/F) 54 which receives recording instructions and data from an external computer 56, a line control circuit 55 which receives data from public telephone line 57, and the like. These devices can operate to execute a facsimile transmission/reception function, a copying function, and a printer function for the external computer. Further, the control unit 24 is connected to an operation panel 58 by which a user performs various operations and inputs various instructions. An LCD 59 which displays messages is provided on the operation panel 58.

Figure 6:
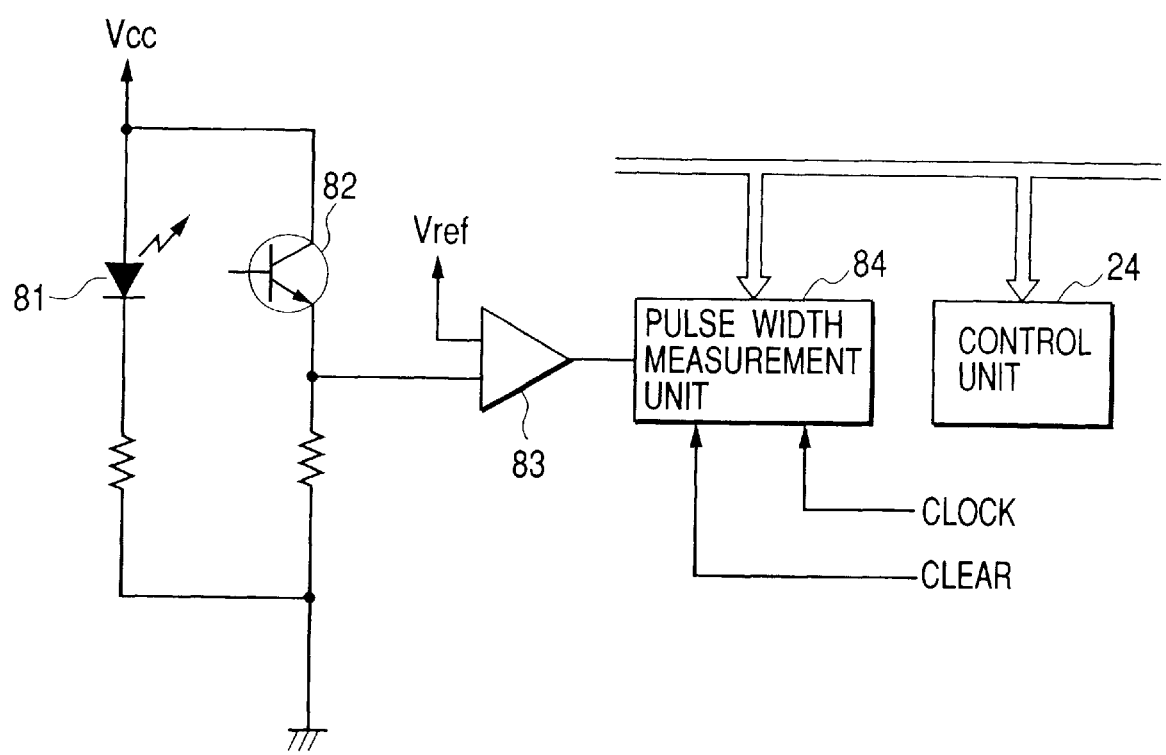
FIG. 6 is a block diagram showing an electrical structure of the photosensor 8.

FIG. 6 is a block diagram showing the electrical structure of the photosensor 8.

In FIG. 6, numeral 81 denotes the infrared LED which acts as the light emission element, numeral 82 denotes the phototransistor which acts as the light reception element to receive infrared light from the LED 81, numeral 83 denotes a comparator which compares the output from the phototransistor 82 with a predetermined reference voltage (Vref), and numeral 84 denotes a pulse width measurement unit which measures a continuation time (a pulse width) of a pulse output from the comparator 83. The pulse width measurement unit 84 sets the pulse width of an input clock (a reference clock) to a reference pulse width, counts how many cycles of the reference clock the continuation time of the pulse output from the comparator 83 is equivalent to, and then outputs the counted value to an internal register of the unit 84.

When the ink is not ejected from the recording head 5, since there is no ink droplet to shade the infrared light from the infrared LED 81 being the light emission element, an H-level signal is input from the phototransistor 82 being the light reception element to the comparator 83. On the other hand, when the ink is ejected from the recording head 5, since the ink droplet ejected shades the infrared light from the infrared LED 81, the output level from the phototransistor 82 decreases gradually. Then, when such the output level falls below the reference voltage (Vref) input to the comparator 83, the output from the comparator 83 to the pulse width measurement unit 84 is inverted. Then, when the ink ejection from the recording head 5 ends, the output from the phototransistor 8 again becomes H level. When such the H-level signal exceeds the reference voltage (Vref) input to the comparator 83, the output from the comparator 83 to the pulse width measurement unit 84 is again inverted.

Thus, the pulse which has the pulse width equivalent to the time that the photosensor 8 detects the ejected ink is input to the pulse width measurement unit 84. As above, such the pulse width is measured by using the reference clock, and the measured value (the counted value) is stored in the internal register of the pulse width measurement unit 84. The counted value is read and used for judging ink presence/absence by the CPU 25 of the control unit 24 after the ink ejection ends.

Figure 7A:
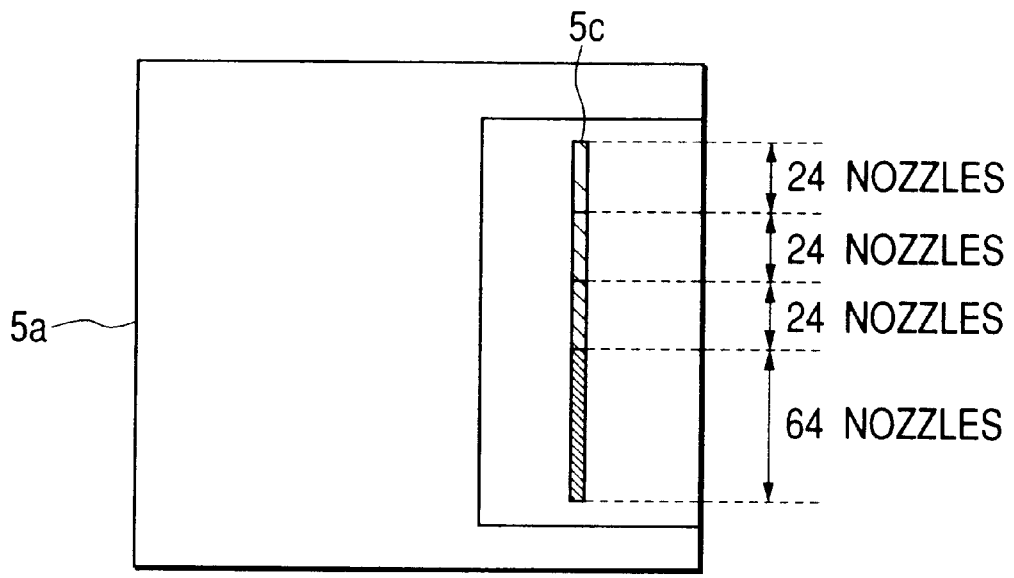
FIGS. 7A and 7B are diagrams showing nozzle structures of color recording and monochrome recording heads.
Figure 7B:
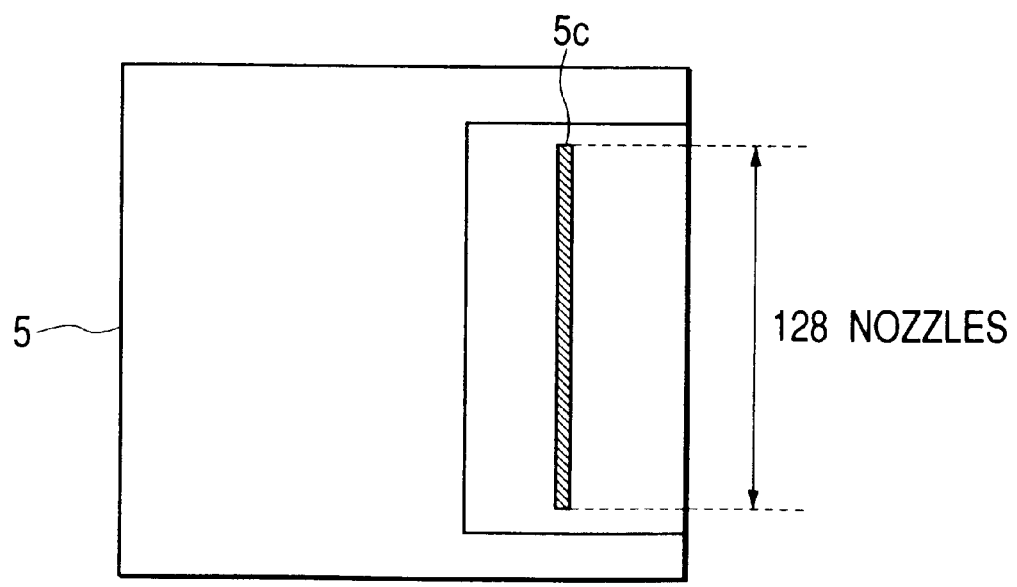

FIGS. 7A and 7B are diagrams showing the nozzle structures of the recording heads used in the facsimile apparatus of FIG. 1. The facsimile apparatus contains a monochrome recording head shown in FIG. 7B and a color recording head shown in FIG. 7A. The monochrome recording head in which 128 nozzles are arranged in a row is dedicated for black ink capable of performing the recording at resolution 360 dpi. The color recording head in which 64 black (K) ink ejection nozzles, 24 yellow (Y) ink ejection nozzles, 24 magenta (M) ink ejection nozzles, and 24 cyan (C) ink ejection nozzles are arranged in a row can perform the color recording at resolution 360 dpi. In the color recording head, since the ink color corresponding to each nozzle has been previously determined, it is possible to select the ink color by selecting the nozzles to which a heat pulse is given. By appropriately using these two kinds of recording heads, it is possible to perform high-speed monochrome recording and full-color recording.

In the facsimile apparatus according to the present embodiment, these two kinds of recording heads, an ink tank which contains black ink dedicated for the monochrome recording, ink tanks which contain Y, M, C and K inks respectively for the general color recording, and an ink tank which contains specific-composition ink to be able to more vividly record a photograph image or the like are combined with others. Thus, following three kinds of cartridges can be selectively installed in the carriage and used.

As these three kinds of cartridges, there are (1) a monochrome cartridge which contains the monochrome recording head and the ink tank for the black ink, (2) a color cartridge which contains the ink tanks for the Y, M, C and K inks and the color recording head, and (3) a color cartridge for photograph recording (called a photograph recording color cartridge) which contains the ink tank for the photograph recording specific-composition ink and the color recording head. As described above, each of these cartridges may be a cartridge in which the recording head is incorporated with the ink tank, or may be a cartridge in which the recording head and the ink tank are independently provided.

In the color cartridge, a set of the C, M, Y and K inks capable of performing general color recording is used.

However, in the photograph recording color cartridge, a set of photograph recording inks is used. It should be noted that the density based on the composition of the photograph recording inks is lighter than the density based on the composition of the ordinary C, M, Y and K inks. Therefore, when the photograph recording color cartridge (sometimes called a light (or pale) color cartridge because light (or pale) color inks are used) is used, it is possible to more minutely control the heat pulse to be applied to the recording head, whereby minute and high-gradational full-color recording as compared with the color recording using the ordinary C, M, Y and K inks can be achieved.

On the other hand, the control unit 24 of the facsimile apparatus detects what kind of cartridge is installed through the signal line in the flexible cable 19. Concretely, when any of the above cartridges is installed in the carriage 15, since a connection pattern of the contact point of the installed cartridge and the contact point of the carriage is different according to the kind of cartridge, the CPU 25 can detect the kind of installed cartridge on the basis of the connection pattern.

Next, a facsimile reception process which is performed by the facsimile apparatus of the above structure will be explained.

FIG. 8 is a flow chart showing the scheme of the facsimile reception process. This flow chart especially describes the part where an attribute management process to discriminate monochrome facsimile reception and color facsimile reception from each other is performed.

Figure 9:
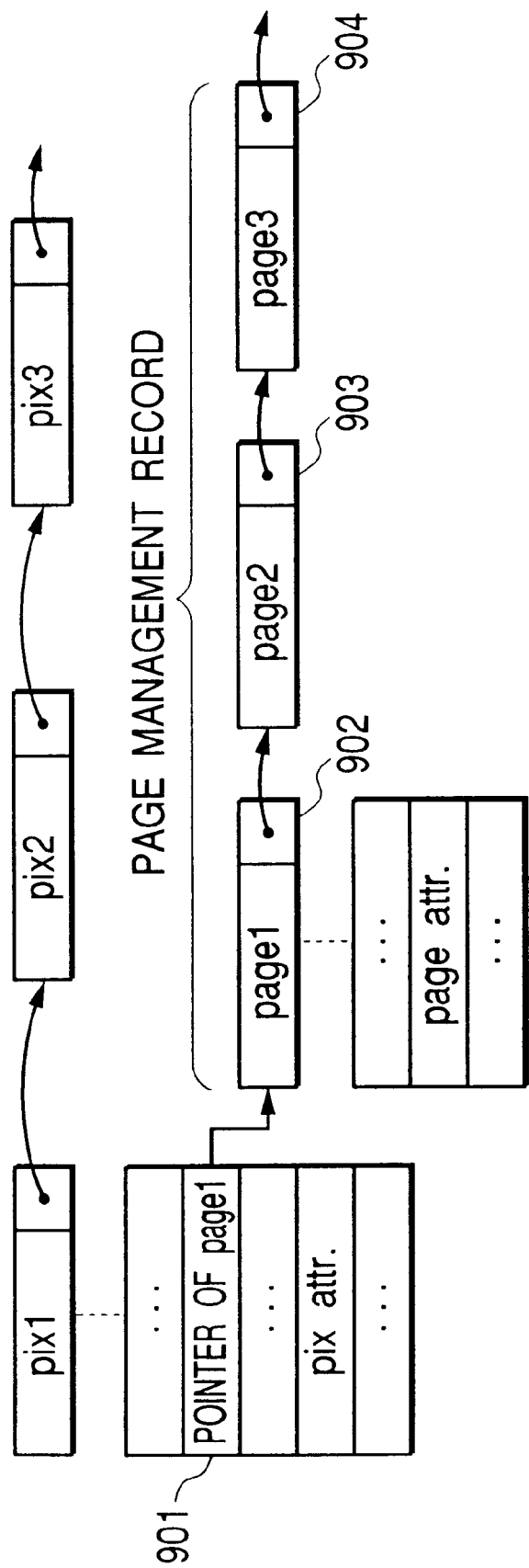
FIG. 9 is a conception diagram showing an image management record.

Further, FIG. 9 is a conception diagram showing an image management record in the facsimile apparatus. It should be noted that the image management record includes a record to manage the image for each reception and a record to manage pages constituting the individual image, and this image management record is allocated (or secured) at a predetermined area in the RAM 27.

Hereinafter, the scheme of the facsimile reception process will be explained with reference to FIGS. 8 and 9.

When the facsimile reception is started, one area (pix m) of the image management record (pix m (m=1, M)) shown in FIG. 9 is allocated (or secured) in a step S101, and the allocated area is added to the list structure of the image management record.

Next, in a step S102, the value of an attribute field (pix attr.) of the image management table (pix m) at the area allocated in the step S101 is initialized to give an attribute represents the facsimile reception image composed of only the monochrome pages. In a next step S103, one area in a page management record (page n (n=1, N)) shown in FIG. 9 is allocated (or secured).

When this page management record represents a first page (page 1) of one reception unit (pix m) in the list, as shown by numeral 901 in FIG. 9, a pointer referring to this page is set to the field (pointer of page 1) of the area (pix m) allocated in the step S101. Conversely, when this page management represents a second or subsequent page, as shown by numerals 902 to 904 in FIG. 9, a pointer referring to that page is added to the list of the page management record of the allocated area (pix m).

It is judged in a step S104 whether the page received hereafter represents the monochrome image or the color image. If judged that the page represents the monochrome image, the flow advances to a step S105, while if judged that the page represents the color image, the flow advances to a step S107.

In the step S105, the attribute value representing the monochrome page is set to the field (page attr.) of the area (page n) allocated in the step S103. In a next step S106, the facsimile image of the monochrome page is received, and the flow advances to a step S110.

On the other hand, in the step S107, the attribute value representing the color page is set to the field (page attr.) of the area (page n) allocated in the step S103. In a next step S108, the field (pix attr.) of the area (pix m) allocated in the step S101 is rewritten to the attribute value which represents the facsimile reception image including at least one color page. Then, in a step S109, the facsimile image of the color page is received, and the flow advances to the step S110.

It is judged in the step S110 whether or not a next page is received in accordance with a facsimile transmission procedure. If judged that the next page is received, the flow returns to the step S103, while if judged that the next page is not received, the facsimile reception process ends.

Next, a process of automatically recording the facsimile reception image will be explained with reference to a flow chart shown in FIG. 10.

First, it is judged in a step S201 whether or not the facsimile reception image exists in the list structure of the image management record shown in FIG. 9. If judged that the facsimile reception image exists in the list structure, the corresponding list is selected, and the flow advances to a step S202. Conversely, if judged that the facsimile reception image does not exist, the flow returns to the step S201.

In the step S202, it is judged whether or not the management record in which the reception and storage of the image of the head page ended (hereinafter, this state is called that the page was determined) exists in the list of the image management record selected in the step S201. If judged that the management record in which the head page was determined exists, the flow advances to a step S203, while if judged that such the management record does not exist, the flow returns to the step S201.

In the step S203, it is judged whether or not the attribute value representing the facsimile reception image including at least one color page is set to the attribute field (pix attr.) of the list of the image management record selected in the step S201. If judged that the attribute value represents the facsimile reception image including only the monochrome pages, the flow advances to a step S204, while if judged that the attribute value represents the facsimile reception image including at least one color page, the flow advances to a step S212.

Next, in the step S204, it is judged through the flexible cable 19 whether the kind of cartridge installed in the recording unit is the monochrome cartridge dedicated for the monochrome recording, or the color cartridge capable of performing the color recording or the light color cartridge for the photograph recording. If judged that the installed recording head is the monochrome cartridge dedicated for the monochrome recording, the flow advances to a step S211. Conversely, if judged that the installed recording head is the cartridge capable of performing the color recording, the flow advances to a step S205.

In the step S205, it is judged whether the installed cartridge is the color cartridge for the general color recording or the light color cartridge for the photograph recording. If judged that the installed cartridge is the color cartridge for the general color recording, the flow advances to a step S206, while if judged that the installed cartridge is the light color cartridge which is expensive as compared with the ordinary color cartridge, the flow advances to a step S210.

In the step S210, the attribute value representing the image subjected to memory substitute reception is set to the field (pix attr.) of the image management record shown in FIG. 9. Thus, the list selected in the step S201 is eliminated from the target of automatic reception. Therefore, in the facsimile image recording by which only lower resolution than the resolution of the general printer image is demanded, it is controlled to use expensive inks. Then, the flow returns to the step S201.

In the step S206, it is judged whether or not no black (K) ink was detected in the automatic recording process of the facsimile reception image immediately before this process is performed. If judged that the black (K) ink still remains, the flow advances to a step S207 to perform in an automatic recording mode the recording of each page corresponding to the list selected in the step S201. The detail of this recording process will be explained later. Conversely, if judged that the black (K) ink does not remain, then it is judged that the recording is impossible, and the flow advances to the step S210 to perform the memory substitute reception.

Next, in a step S208, it is judged whether or not the recording of each page corresponding to the selected list normally ends in the step S207. If judged that the recording normally ends, the flow advances to a step S209 to delete the list corresponding to the facsimile reception image of which recording normally ended from the image management record shown in FIG. 9 and release the storage area. Then, the flow returns to the step S201. Conversely, if not judged that the recording normally ends, the flow advances to the step S210 to perform the memory substitute reception.

In the step S211, it is judged whether or not no black (K) ink was detected in the automatic recording process of the facsimile reception image immediately before this process is performed. If judged that the black (K) ink still remains, the flow advances to the step S207, while if judged that the black (K) ink does not remain, then it is judged that the recording is impossible, and the flow advances to the step S210 to perform the memory substitute reception.

If judged in the step S203 that the facsimile reception image includes at least one color page, the flow advances to the step S212. In this case, it is first judged through the flexible cable 19 whether or not the kind of installed cartridge is the monochrome cartridge dedicated for the monochrome recording. If judged that this cartridge is the monochrome cartridge, since the color facsimile reception image can not be recorded, the flow advances to the step S210.

On the other hand, if judged in the step S212 that the color cartridge capable of performing the color recording is installed, the flow advances to a step S213 to further judge whether the installed cartridge is the color cartridge for the ordinary color recording or the light color cartridge. If judged that the ordinary color cartridge is installed, the flow advances to a step S214. Conversely, if judged that the installed cartridge is the light color cartridge which is expensive as compared with the ordinary color cartridge, the flow advances to the step S210 to eliminate the selected list from the target of the automatic reception and perform the memory substitute reception. Thus, it is controlled to use the expensive inks.

In the step S214, it is judged whether or not any of no cyan (C) ink, no magenta (M) ink and no yellow (Y) ink was detected in the automatic recording process of the color facsimile reception image immediately before this process is performed. If judged that all the C, M and Y inks remain, the flow advances to the step S215, while if judged that any no C ink, no M ink or no Y ink was detected, then it is judged that the recording is impossible, and the flow advances to the step S210 to perform the memory substitute reception.

In the step S215, it is further judged whether or not no black (K) ink was detected in the automatic recording process of the facsimile reception image immediately before this process is performed. If judged that the black (K) ink still remains, the flow advances to the step S207, while if judged that the black (K) ink does not remain, the flow advances to a step S216.

In the step S216, it is judged whether or not process black where black is generated or represented by using the C, M and Y inks instead of the black (K) ink is permitted by the user. If judged that the process black is permitted, the flow advances to the step S207, while if judged that the process black is not permitted, it is judged that the recording is impossible, and the flow advances to the step S210 to perform the memory substitute reception.

Next, the detail of the recording process in the step S207 will be explained with reference to a flow chart shown in FIG. 11.

First, in a step S301, it waits until the head page of the list selected in the step S201 is determined (i.e., the reception and storage of the image of the head page end). When the head page is determined, this page is selected, and the flow advances to a step S302 to record the selected page in a designated mode. The detail of the page recording process will be explained later.

Next, in a step S303, it is judged whether or not the page recording in the step S302 normally ends. If judged that the page recording normally ends, the flow advances to a step S304. Conversely, if judged that the page recording abnormally ends due to no recording sheet, a recording sheet jam, ink empty or the like, the flow advances to a step S308.

In the step S304, it is judged whether or not the recording process for each reception corresponding to the selected list is started in the automatic recording mode. If judged that the recording process is started in the automatic recording mode, the flow advances to a step S305 to delete from the image management record in FIG. 6 the page management record corresponding to the page that the normal recording ended and thus release the corresponding area. Namely, the image which had been recorded was deleted from the memory. Then, the flow advances to a step S306. Conversely, if judged that the recording process is not started, the flow directly advances to the step S306.

In the step S306, it is judged whether or not the reception image corresponding to the list selected in the step S201 includes a next page. If judged that the reception image includes the next page, the flow returns to the step S301, while if judged that the reception image does not include the next page, the flow advances to a step S307.

In the step S307, normal end is notified, and then the recording process ends. On the other hand, in the step S308, abnormal end is notified, and the recording process ends.

Figure 12:
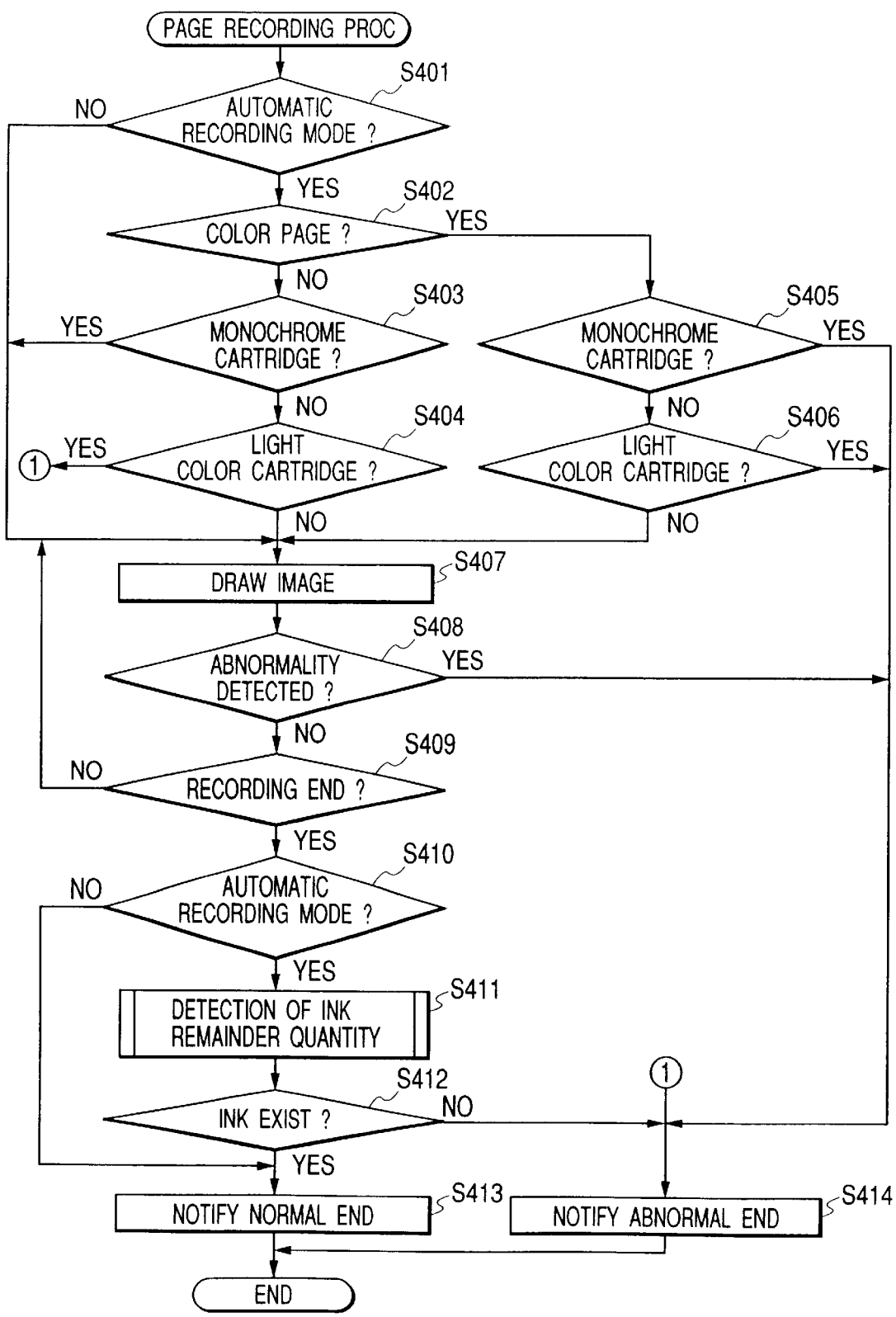
FIG. 12 is a flow chart showing a page recording process in detail.

Next, the page recording process in the step S302 will be explained with reference to a flow chart shown in FIG. 12.

First, in a step S401, it is judged whether or not the page recording process is started in the automatic recording mode. If judged that the page recording process is started in the automatic recording mode, the flow advances to a step S402. Conversely, if judged that the page recording process is not started in the automatic recording mode, it is judged that the user permitted that the color image is subjected to the monochrome recording and the higher-minute image is output by using expensive ink, and the flow advances to the step S407.

Next, in the step S402, it is judged whether or not the attribute value representing the color page is set to the field (page attr.) of the page management record in the list selected in the step S301. If judged that this attribute value represents the monochrome page, the flow advances to a step S403, while if judged that this attribute value represents the color page, the flow advances to a step S405.

In the step S403, it is judged through the flexible cable 19 whether or not the installed cartridge is the monochrome cartridge. If judged that the installed cartridge is the monochrome cartridge, the flow advances to a step S407, while if judged that the installed cartridge is the cartridge other then the monochrome cartridge, the flow advances to a step S404.

In the step S404, it is judged whether the installed cartridge is the ordinary color cartridge or the light color cartridge. If judged that the installed cartridge is the ordinary color cartridge, the flow advances to the step S407, while if judged that the installed cartridge is the light color cartridge which is expensive as compared with the ordinary color cartridge, the flow advances to a step S414 to eliminate the facsimile image corresponding to the list selected in the step S301 from the target of the automatic recording. Thus, in the facsimile image recording by which only lower resolution than the resolution of the general printer image is demanded, it is controlled to use expensive inks. Then, it is notified that the normal recording is impossible. Such the notification is judged in the step S303.

On the other hand, in the step S405, it is judged through the flexible cable 19 whether or not the installed cartridge is the monochrome cartridge. If judged that the installed cartridge is the monochrome cartridge, since the color-page image can not be recorded, the flow advances to the step S414. Conversely, if judged that the installed cartridge is the cartridge capable of performing the color recording, the flow advances to a step S406.

In the step S406, it is judged whether the installed cartridge is the ordinary color cartridge or the light color cartridge. If judged that the installed cartridge is the ordinary color cartridge, the flow advances to the step S407, while if judged that the installed cartridge is the light color cartridge which is expensive rather than the ordinary color cartridge, the flow advances to the step S414 to eliminate from the automatic recording target the facsimile image corresponding to the list selected in the step S301. Thus, it is controlled to perform the facsimile image recording in which the expensive ink is used. Then, it is notified that the normal recording is impossible. Such the notification is judged in the step S303.

In the step S407, facsimile image information of the recording page is decoded for each line or each specific block, and image drawing process is performed. While the image drawing process is being performed, it is judged in a step S408 whether or not abnormality occurs in a recording system. If judged that the abnormality occurs, the flow advances to the step S414, while if judged that any abnormality does not occur, the flow advances to a step S409. In the step S409, it is judged whether or not the recording of one page ends. If judged that the recording does not end, the flow returns to the step S407 to continue the image drawing process, while if judged that the recording ends, the flow advances to a step S410.

In the step S410, it is again judged whether or not the page recording process is started in the automatic recording mode. If judged that the page recording process is started in the automatic recording mode, the flow advances to a step S411 to perform ink remainder quantity detection process. Conversely, if judged that the page recording process is not started in the automatic recording mode, this process is skipped, and the flow advances to a step S413. The reason to skip the ink remainder quantity detection process is as follows. Namely, when the page recording process is not started in the automatic recording mode, since the image is not automatically deleted from the memory after the recording ended, it is necessary to prevent that the ink is consumed to detect the ink remainder quantity.

In the step S411, the ink remainder quantity detection process is performed according as the page is subjected to the monochrome recording or the color recording. The detail of this process will be described later.

In a step S412, it is judged based on the ink remainder quantity detection process whether there is the ink. If judged that the ink still remains, the flow advances to the step S413, while if judged that the ink has gone, the flow advances to the step S414.

In the step S413, normal end is notified, and then the page recording process ends. On the other hand, in the step S414, abnormal end is notified, and the page recording process ends.

Figure 13:
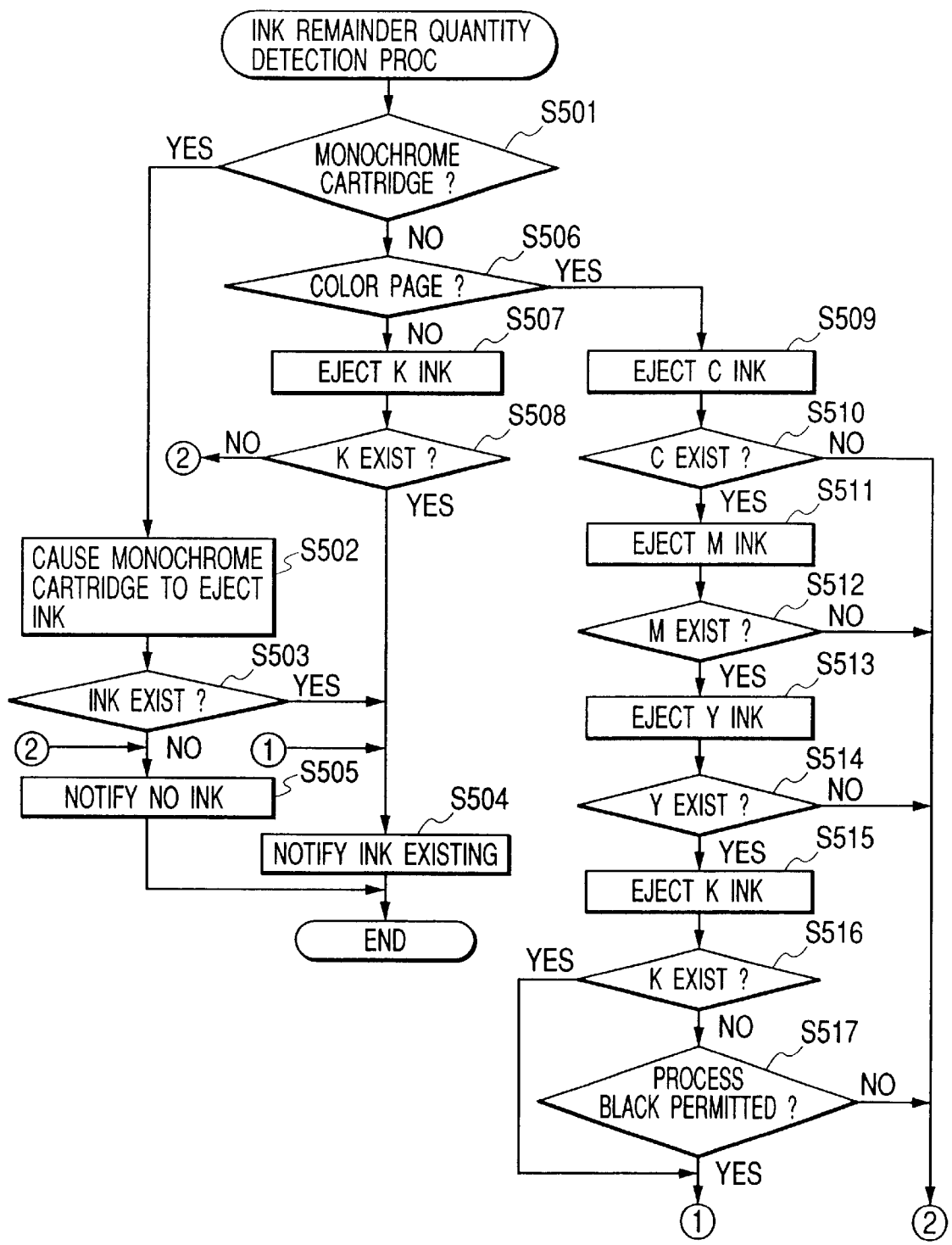
FIG. 13 is a flow chart showing an ink remainder detection process in detail.

Next, the detail of the ink remainder quantity detection process in the step S411 will be explained with reference to a flow chart shown in FIG. 13.

First, in a step S501, it is judged through the flexible cable 19 whether the installed cartridge is the monochrome cartridge or the cartridge (i.e., the color cartridge or the light color cartridge) capable of performing the color recording. If judged that the installed cartridge is the monochrome cartridge, the flow advances to a step S502. Conversely, if judged that the installed cartridge is the cartridge capable of performing the color recording, the flow advances to a step S506.

In the step S502, the recording head (FIG. 7B) contained in the monochrome cartridge is moved to the position of the photosensor 8, the infrared LED 81 is turned on, and the black (K) ink is ejected, whereby the black (K) ink remainder quantity is detected. As described above, such the ejected ink droplet crosses the optical axis extending between the light emission and reception elements of the photosensor 8.

In a step S503, after the ejection process in the step S502, it is judged whether or not the black (K) ink still remains based on the count value of the pulse width measurement unit 84. If judged that the black (K) ink still remains, the flow advances to a step S504, while if judged that the black (K) ink does not remain, the flow advances to a step S505.

In the step S504, it is notified that the ink remains (the notification is performed in the step S412). On the other hand, in the step S505, it is notified that the ink does not remain (the notification is performed in the step S412). Then, the ink remainder quantity detection process ends.

In the step S506, it is judged whether the kind of recording for the page subjected to the page recording process is the monochrome recording or the color recording. If judged that the kind of recording is the monochrome recording, the flow advances to a step S507, while if judged that the kind of recording is the color recording, the flow advances to a step S509.

Next, in the step S507, the recording head (FIG. 7A) contained in the cartridge (i.e., the color cartridge or the light color cartridge) capable of performing the color recording is moved to the position of the photosensor 8, the infrared LED 81 is turned on, the heat pulse is given only to the nozzle by which the black (K) ink is ejected, and the black (K) ink is ejected, whereby the black (K) ink remainder quantity is detected.

Next, in a step S508, after the ejection process in the step S507, it is judged whether or not the black (K) ink still remains based on the count value of the pulse width measurement unit 84. If judged that the black (K) ink remains, the flow advances to the step S504, while if judged that the black (K) ink does not remain, the flow advances to the step S505. In the step S509, the recording head (FIG. 7A) contained in the cartridge (i.e., the color cartridge or the light color cartridge) capable of performing the color recording is moved to the position of the photosensor 8, the infrared LED 81 is turned on, the heat pulse is given only to the nozzle corresponding to the cyan (C) ink, and the ink is ejected, whereby the cyan (C) ink remainder quantity is detected.

Next, in a step S510, after the ejection process in the step S509, it is judged whether or not the cyan (C) ink still remains based on the count value of the pulse width measurement unit 84. If judged that the cyan (C) ink remains, the flow advances to a step S511, while if judged that the cyan (C) ink does not remain, the flow returns to the step S505.

Further, in the step S511, the magenta (M) ink remainder quantity is detected as well as the step S509. Then, in a step S512, after the ejection process in the step S511, it is judged whether or not the magenta (M) ink still remains as well as the step S510. If judged that the magenta (M) ink remains, the flow advances to a step S513, while if judged that the magenta (M) ink does not remain, the flow returns to the step S505.

Further, in the step S513, the yellow (Y) ink remainder quantity is detected as well as the step S509. Then, in a step S514, after the ejection process in the step S513, it is judged whether or not the yellow (Y) ink still remains as well as the step S510. If judged that the yellow (Y) ink remains, the flow advances to a step S515, while if judged that the yellow (Y) ink does not remain, the flow returns to the step S505.

In the step S515, the black (K) ink remainder quantity is detected as well as the step S507. Then, in a step S516, after the ejection process in the step S515, it is judged whether or not the black (K) ink still remains as well as the step S508. If judged that the black (K) ink remains, the flow returns to the step S504, while if judged that the black (K) ink does not remain, the flow advances to a step S517.

In the step S517, it is judged whether or not the process black process that black is generated by using the C, M and Y inks instead of the black (K) ink is permitted by the user. If judged that the process black is permitted, the flow advances to the step S504, while if judged that the process black is not permitted, it is judged that the recording is impossible, and the flow returns to the step S505.

Next, the memory reference recording process that an image stored in the memory is manually selected and recorded by a user will be explained with reference to a flow chart shown in FIG. 14.

In a step S601, the user handles the operation panel 58 to select a memory reference recording mode. In this mode, one of the plural images stored in the memory is selected.

In a step S602, it is judged whether or not each page of the image selected in the step S601 includes a color page. If judged that all the pages constituting the selected image are monochrome pages, the flow advances to a step S603. Conversely, if judged that the pages constituting the selected image include at least one color page, the flow advances to a step S607.

In the step S603, it is judged through the flexible cable 19 whether the installed cartridge is the monochrome cartridge. If judged that the installed cartridge is the monochrome cartridge, the flow advances to a step S606. Conversely, if judged that the installed cartridge is the cartridge other than the monochrome cartridge, the flow advances to a step S604.

Further, in the step S604, it is judged whether the installed cartridge is the ordinary color cartridge or the light color cartridge. If judged that the installed cartridge is the ordinary color cartridge, the flow advances to the step S606. Conversely, if judged that the installed cartridge is the light color cartridge, the flow advances to a step S605.

In the step S605, it is inquired of the user whether the monochrome facsimile image selected in the step S601 is to be recorded by using the expensive light color cartridge. If judged that such the recording is permitted by the user, the flow advances to the step S606, while if judged that such the recording is not permitted, the memory reference recording process ends.

Figure 11:
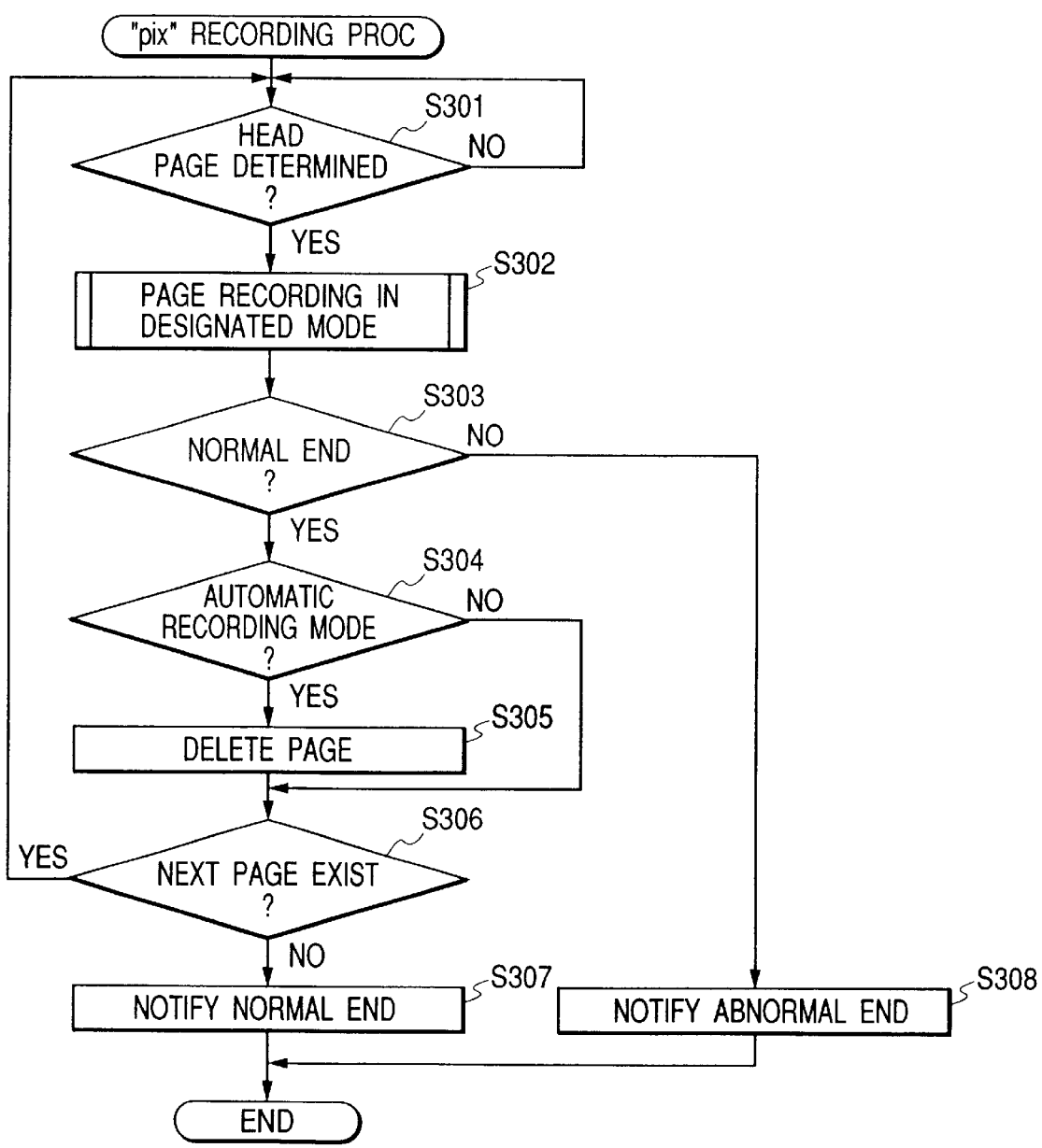
FIG. 11 is a flow chart showing a recording process in detail.

In the step S606, the recording process shown in the flow chart of FIG. 11 is performed such that each page of the image selected in the step S601 is recorded in the manual mode, and the memory reference recording process ends. Here, since the memory reference recording process is not performed in the automatic recording mode, the image management record is not deleted even after the recording ended, whereby the recording is possible again.

On the other hand, in the step S607, it is judged through the flexible cable 19 whether the installed cartridge is the monochrome cartridge. If judged that the installed cartridge is the monochrome cartridge, the flow advances to a step S608. Conversely, if judged that the installed cartridge is the cartridge other than the monochrome cartridge, the flow advances to the step S604.

In the step S608, it is inquired of the user whether the color page included at least one in the selected image is to be converted into the monochrome image and then recorded. If judged that such the monochrome recording is permitted by the user, the flow advances to the step S606, while if judged that such the monochrome recording is not permitted, the memory reference recording process ends.

By designating the manual mode as above, the process in the step S305 to delete the page, the process in the steps S402 to S406 to control the recording by the combination of the kind of page (the color image page or the monochrome image page) and the kind of cartridge, and the process in the steps S411 to S412 to detect the ink remainder quantity are skipped. Namely, the page of which recording has ended is not deleted. Further, in accordance with the user's instructions, it is possible to convert the color image into the monochrome image and then record the converted image, to record the higher-minute color facsimile image by using the expensive light color cartridge, and to suppress the ink consumption by controlling the unnecessary ink remainder quantity detection process for the image not deleted.

Figure 15:
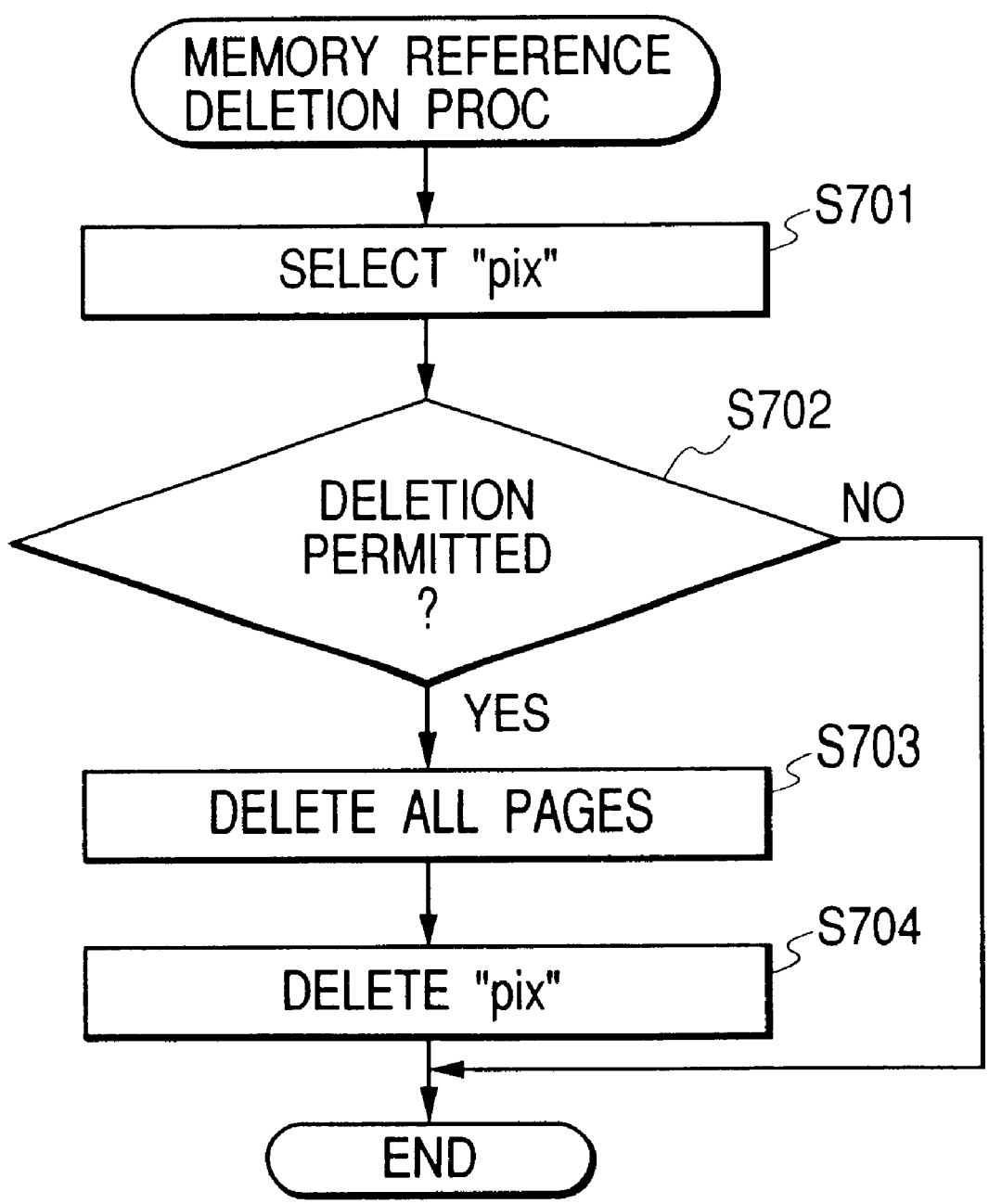
FIG. 15 is a flow chart showing a memory reference deletion process.

FIG. 15 is a flow chart showing memory reference deletion process that an image stored in the memory is manually selected and deleted by a user.

First, in a step S701, the user handles the operation panel 58 to select a memory reference deletion mode and then select one of the plural images stored in the memory.

In a step S702, by way of caution, it is inquired of the user whether the selected can be really deleted. If the deletion is permitted by the user, the flow advances to a step S703, while if the deletion is not permitted, the memory reference deletion process ends.

In the step S703, all the pages constituting the selected image are deleted. Next, in a step S704, the list corresponding to the selected image is deleted from the image management record shown in FIG. 9, and the corresponding storage area is released. Then, the memory reference deletion process ends.

Figure 14:
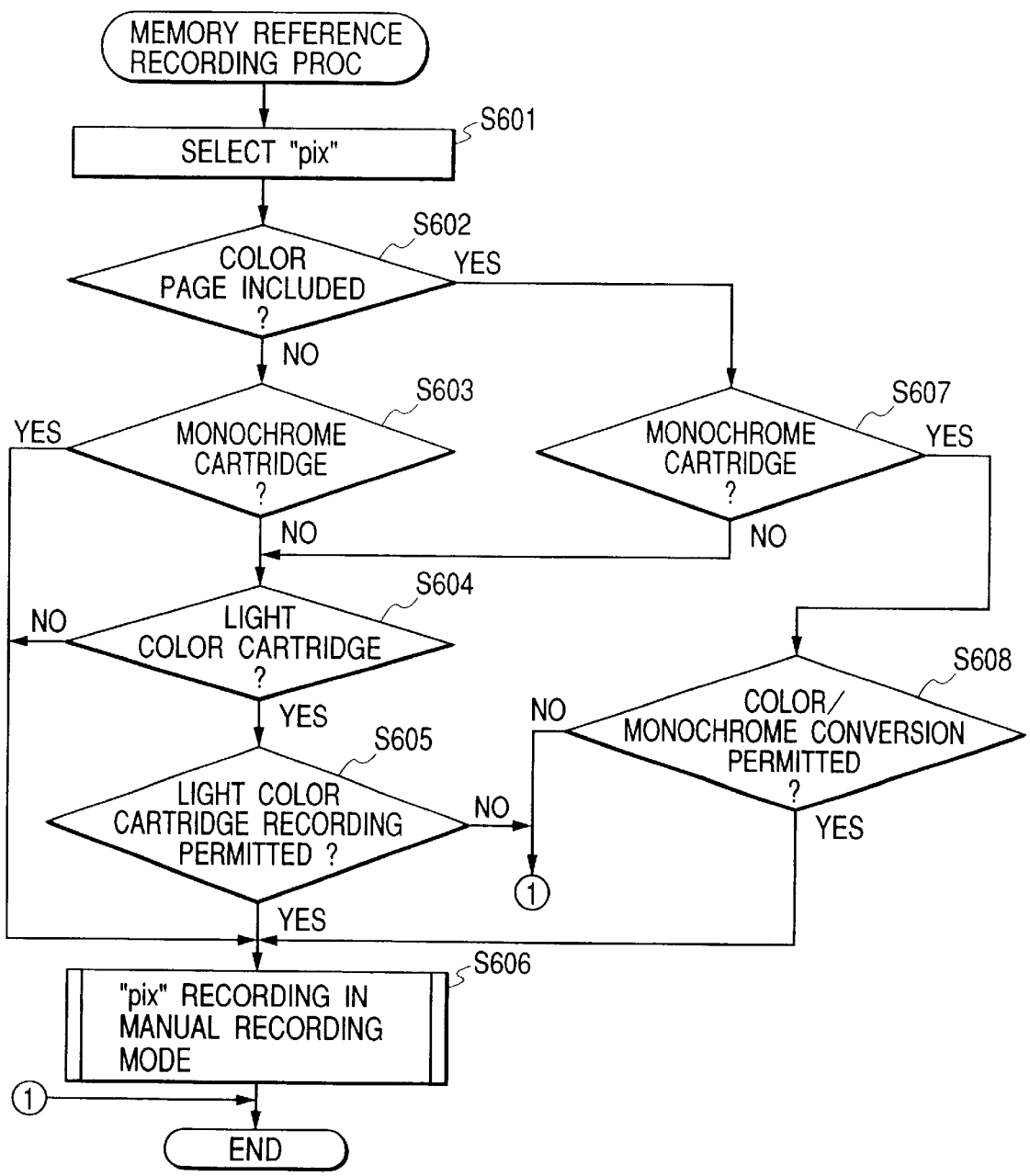
FIG. 14 is a flow chart showing a memory reference recording process.

As above, by combining the process of FIG. 14 with the process of FIG. 15 with each other, for example, when a color facsimile image is received though there is only the monochrome cartridge in the recording unit, such the color image is output for the time being, and the content of the received image is previewed and confirmed. Thus, when the monochrome output does not have a special problem either, it is possible to delete such the output image from the memory.

Figure 10:
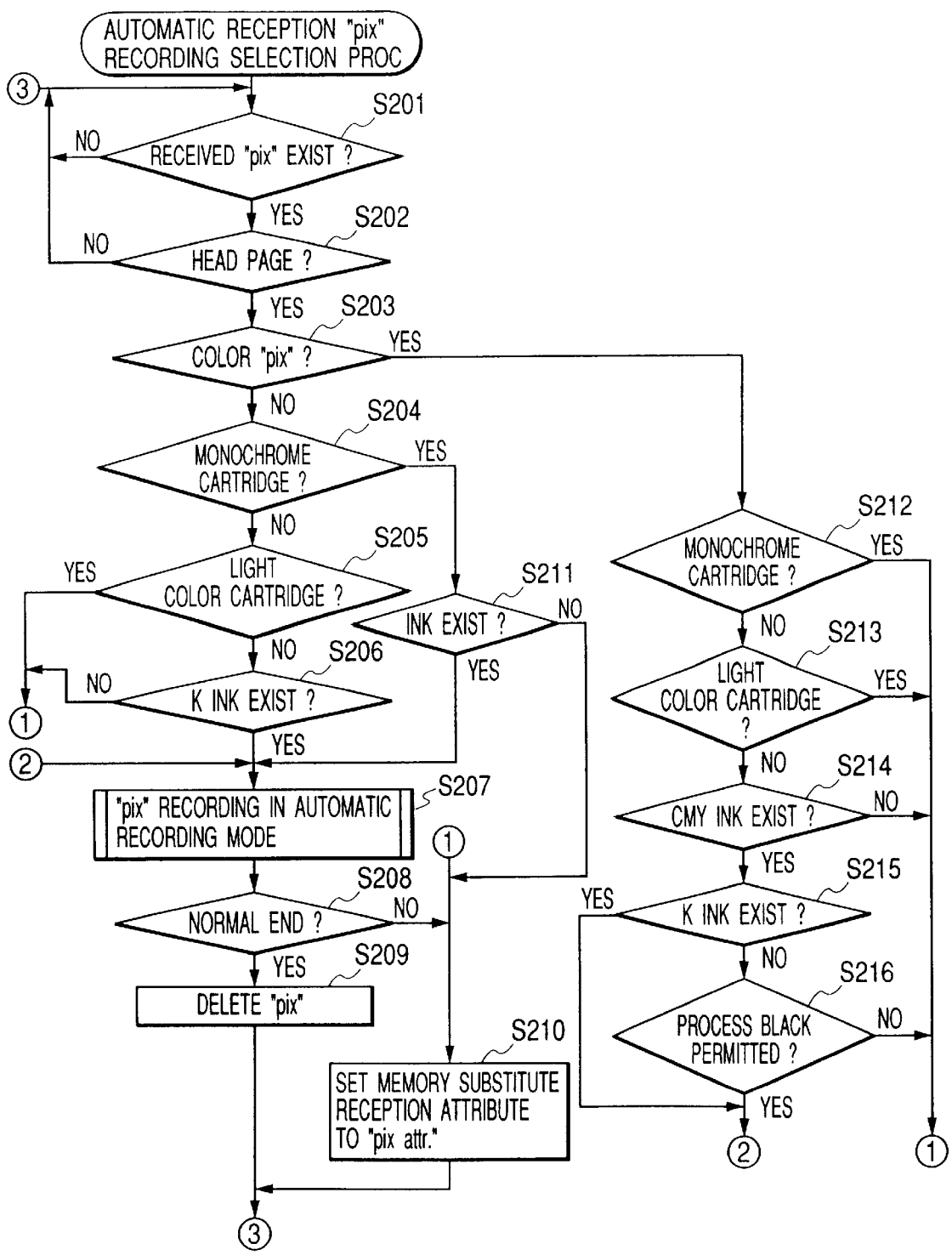
FIG. 10 is a flow chart showing an automatic recording process of a facsimile reception image.

Further, if the color output is necessary, the image is not deleted after the printing, and the color cartridge is installed anew, whereby the recording operation is automatically performed by the process shown in FIG. 10 to print and output the color image. Then, when the print output normally ends, the image in question is automatically deleted from the memory.

Second Embodiment

In the process shown in FIGS. 14 and 15, it is necessary to practically provide such the function as in the steps S601 and S701 to search or retrieve the image for referring to the memory.

For example, in an at-home low-cost color facsimile apparatus, the capacity of an image memory is limited. Thus, substitute reception of many images for which the function of referring to the memory is demanded can not often be performed. Further, as compared with a large-sized working apparatus, it is difficult in the at-home apparatus to provide the memory reference function by using limited resources such as an LCD and the like.

Figure 16:
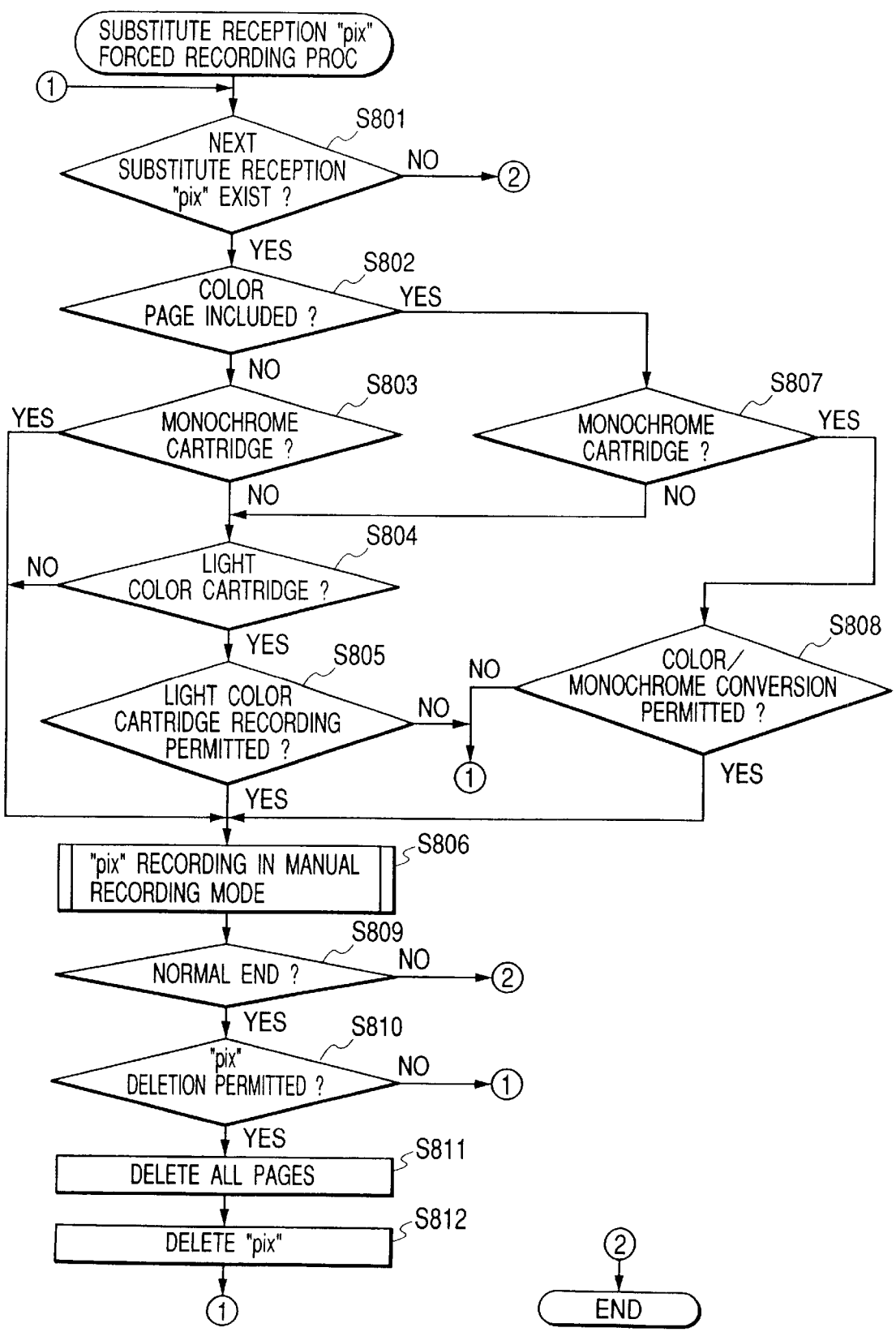
FIG. 16 is a flow chart showing a forced recording process of a substitute reception image.

FIG. 16 is a flow chart showing in detail forced recording process of a substitute reception image. In this process, on the basis of the automatic reception image recording selection process shown in FIG. 10, the facsimile image subjected to the substitute reception in the memory because the kind of cartridge was inappropriate is forcedly output according to the user's instruction.

When the user handles the operation panel 58 to request the forced recording of the substitute reception image, the process in FIG. 16 is performed.

First, in a step S801, it is judged whether or not the substitute reception attribute set in the step S210 of FIG. 10 exists in the list of the image management record shown in FIG. 9. If judged that the substitute reception image exists, such the list is selected, and the flow advances to a step S802. Conversely, if judged that the substitute reception image does not exist, the substitute reception image forced recording process ends.

In the step S802, it is judged whether or not the selected image includes a color page. If judged that all the pages constituting the selected image are monochrome pages, the flow advances to a step S803. Conversely, if judged that the pages constituting the selected image include at least one or more color page, the flow advances to a step S807.

In the step S803, it is judged through the flexible cable 19 whether the cartridge installed in the recording unit is the monochrome cartridge. If judged that the installed cartridge is the monochrome cartridge, the flow advances to a step S806. Conversely, if judged that the installed cartridge is the cartridge other than the monochrome cartridge, the flow advances to a step S804.

Further, in the step S804, it is judged whether the installed cartridge is the ordinary color cartridge or the light color cartridge. If judged that the installed cartridge is the ordinary color cartridge, the flow advances to the step S806. Conversely, if judged that the installed cartridge is the light color cartridge which is expensive rather than the ordinary color cartridge, the flow advances to a step S805.

In the step S805, it is inquired of the user whether the monochrome facsimile image selected in the step S801 is to be recorded by using the expensive light color cartridge. If judged that such the recording is permitted by the user, the flow advances to the step S806, while if judged that such the recording is not permitted, the image selected in the step S801 is eliminated from the forced output target, and the flow returns to the step S801 to select a next substitute reception image.

In the step S806, the recording process shown in the flow chart of FIG. 11 is performed to record the each-page image selected in the step S801, and the flow advances to a step S809.

On the other hand, in the step S807, it is judged through the flexible cable 19 whether the cartridge installed in the recording unit is the monochrome cartridge. If judged that the installed cartridge is the monochrome cartridge, the flow advances to a step S808. Conversely, if judged that the installed cartridge is the cartridge other than the monochrome cartridge, the flow advances to the step S804.

In the step S808, it is inquired of the user whether the color page included at least one in the selected image is to be converted into the monochrome image and then recorded. If judged that such the monochrome recording is permitted by the user, the flow advances to the step S806, while if judged that such the monochrome recording is not permitted, the image selected in the step S801 is eliminated from the forced output target, and the flow returns to the step S801 to select a next substitute reception image.

Next, in the step S809, it is judged whether or not the recording of each page corresponding to the selected list in the step S808 normally ends. If judged that such the recording normally ends, the flow advances to a step S810. Conversely, if judged that such the recording does not normally end, the substitute reception image forced recording process ends. At the time when such the recording ends, the image data leaves preservation in the memory.

In the step S810, it is inquired of the user whether the image to which the recording normally ended can be deleted. If the deletion is permitted by the user, the flow advances to a step S811, while if the deletion is not permitted, the substitute reception image forced recording process ends.

In the step S811, all the pages constituting the image to which the recording normally ended are deleted. Further, in a step S812, the list corresponding to the image to which the recording normally ended is deleted from the image management record shown in FIG. 9, and the corresponding storage area is released. Then, the substitute reception image forced recording process ends.

By applying the above structure, even in the at-home low-cost color facsimile apparatus, it is possible to achieve the object as well as the first embodiment.

Incidentally, in the step S802 of FIG. 16, it is judged whether or not each facsimile image subjected to the substitute reception includes the color page. However, in this step, it is possible to judge or search the color page in all the facsimile reception images including the substitute reception images, and then perform the processes in the steps S803 to S805, S807 and S808 for only the first cycle of the substitute reception image forced recording process. Namely, when the recording by the light color cartridge is not permitted in the step S805, or when the recording after converting the color image into the monochrome image is not permitted in the step S808, the substitute reception image forced recording process is ended. Further, when the deletion is not permitted in the step S810, or when the process in the step S812 ended, the flow is returned to the step S806. By doing so, the user only has to receive only the first one inquiry which concerns the disagreement between the received facsimile image and the installed cartridge.

Other Embodiments

In the above explained embodiments, it was explained the facsimile apparatus in which one of the monochrome cartridge, the color cartridge, the photograph recording minute color cartridge (the light color cartridge) can be selected and installed.

However, the present invention is not limited to this. For example, even in a facsimile apparatus which has a structure that either the monochrome cartridge or the color cartridge can be selectively installed, if all the processing steps to check the light color cartridge in the above explained processes are skipped, the object of the present invention can be achieved.

Further, in the above embodiments, the facsimile apparatus which uses the inkjet-system recording unit was explained by way of example. However, the present invention is not limited to this. For example, if an apparatus in which an electrophotographic-system laser beam color printer is used in its recording unit is used, and if this apparatus has a structure that any of a monochrome recording toner cartridge, a general color recording color toner cartridge and a minute recording corpuscle color toner cartridge can be selected and installed by the user, the present invention is applicable to this apparatus, and the object of the present invention can be achieved.

In the above embodiments, when especially an inkjet recording system in which the means (e.g., an electrothermal transducer, a laser or the like) for generating thermal energy as ink ejection energy is provided and the ink state change is caused by the generated thermal energy is used, high-density and high-minute recording can be achieved.

As the representative structure and principle of the above system, the basic principle described in, e.g., U.S. Pat. Nos. 4,723,129 and 4,740,796 is preferable. This system is applicable to both so-called on-demand type and continuous type. Especially, in case of the on-demand type, when at least one driving signal which corresponds to recording information and brings a rapid temperature rise is supplied to the electrothermal transducer which is disposed for the sheet and the liquid path on which the liquid (ink) has been held, thermal energy is generated from the electrothermal transducer to cause film boiling on the thermal affection face of the recording head. As a result, since a bubble one-to-one corresponding to this driving signal by couple 1 can be formed in the liquid (ink), this on-demand type is effective. The liquid (ink) is ejected through the ejection orifice by means of growth and shrinkage of the bubble, whereby at least one droplet is formed. If it is assumed that this driving signal has a pulse shape, since the growth and shrinkage of the bubble is appropriately performed rapidly, it is more preferably possible to achieve the liquid (ink) ejection especially excellent in responsiveness.

As such the driving signal having the pulse shape, the signals described in U.S. Pat. Nos. 4,463,359 and 4,345,262 are suitable. Further, if the condition described in U.S. Pat. No. 4,313,124 concerning the a temperature rising ratio on the thermal affection face is applied, it is possible to achieve further excellent recording.

As the structure of the recording head, in addition to the combination (a linear liquid path or a right-angled liquid path) of the orifice, the liquid path and the electrothermal transducer described in the above patent documents, the structure described in U.S. Pat. No. 4,558,333 that the thermal affection face is disposed on the inflexed area, and the structure described in U.S. Pat. No. 4,459,600 are included in the present invention. In addition, the structure described in Japanese Patent Application Laid-Open No. 59-123670 that the common slot is used as the ejection units for the plural electrothermal transducers, and the structure described in Japanese Patent Application Laid-Open No. 59-138461 that the aperture absorbing a pressure wave of thermal energy is used as the orifice may be applied.

Further, as a full-line type recording head which has the length corresponding to the width of a maximum recording medium on which the recording apparatus can perform recording, the combination of the plural recording heads described in the above documents is applicable to satisfy such the length. Also, a single recording head integrally manufactured is applicable to this full-line type recording head.

Further, in addition to the cartridge-type recording head which is incorporated with the ink tank as explained in the above embodiments, it is possible to use an exchangeable chip-type recording head which can be electrically connected to the body of the apparatus and receive supplied ink when it is installed in this body.

Further, it is preferable to add a recovery means for the recording head, preliminary means and the like to the structure of the recording apparatus described above, because the recording operation can be more steadied. Concretely, a capping means for the recording head, a cleaning means for the recording head, a compression and decompression means, an electrothermal transducer, another heating element, and a preliminary heating means composed of the electrothermal transducer and the heating element, and the like are applicable as the above means. Further, when a preliminary ejection mode in which ejection different from that for the recording is performed is provided, it is effective to steady the recording.

As the ink to be used, ink which solidifies by a room temperature and a temperature lower than it can be used, and also ink which softens or liquefies at the room temperature can be used. In the inkjet system, generally the temperature of the ink itself is adjusted to be within the range from 30° C. to 70° C., thereby controlling ink viscosity to be within a stable ejection range. Thus, the user only has to use ink which is liquid when the recording signal to be used is given.

In addition, in order to actively use a temperature rise due to thermal energy as the energy to be consumed when an ink state is changed from a solid state to a liquid state and thus prevent such the temperature rise, and in order to prevent evaporation, it is possible to use ink which solidifies when leaving it and liquefies when heating it. In any case, the present invention is applicable to a case where ink having a characteristic to liquefy for the first time by supply of the thermal energy. As such the ink, there are ink which liquefies by supply of the thermal energy according to the recording signal and is ejected, ink which has already solidified at a time when this ink reaches a recording medium, and the like. In such a case, as described in Japanese Patent Application Laid-Open No. 54-56847 or 60-71260, it is possible to adopt the form in which the ink opposes to the electrothermal transducer in the state that the ink is held in a concave part or a penetration hole of a porous sheet as liquid or solid. In the present invention, to be the most effective to above each ink is to execute the above film boiling system.

Further, the recording apparatus according to the present invention can be provided unitarily or independently as an image output terminal of information process equipment such as a computer or the like, and further provided as a copying machine in which a reader or the like is incorporated.

The present invention is applicable to a system composed of plural devices (e.g., a host computer, an interface device, a reader, a printer and the like) or to an apparatus including a single device (e.g., a copying machine, a facsimile machine or the like).

It is needless to say that the object of the present invention can be achieved when a storage medium (or a recording medium) storing program codes of software for realizing the functions of the above embodiments is supplied to a system or an apparatus and then a computer (or CPU or MPU) in the system or the apparatus reads and executes the program codes stored in the storage medium. In this case, the program codes themselves read from the storage medium realize the functions of the above embodiments, and thus the storage medium storing such the program codes constitutes the present invention. Further, it is needless to say that the present invention also includes not only the case where the functions of the above embodiments are realized by executing the program codes read with the computer, but also a case where an OS (operating system) or the like running on the computer executes all or a part of actual processes on the basis of instructions of the program codes, thereby realizing the functions of the embodiments.

Further, it is needless to say that the present invention further includes a case where the program codes read from the storage medium are once stored in a memory provided in a function expansion card inserted in the computer or a function expansion unit connected to the computer, and then a CPU or the like provided in the function expansion card or the function expansion unit executes all or a part of actual processes on the basis of instructions of the program codes, thereby realizing the functions of the above embodiments.

The present invention is not limited to the above embodiments. Namely, it is obvious that various modifications and changes are possible in the present invention without departing from the spirit and scope of the appended claims.

What is claimed is:

1. An image communication apparatus comprising:
   reception means for receiving an image, the image being a monochrome image or a color image;
   first discrimination means for discriminating whether the image received by said reception means is a monochrome image or a color image;
   a printing unit for performing monochrome printing or color printing of the image received by said reception means, wherein cartridges corresponding to kinds of images to be printed may be selectively and exchangeably installed in said printing unit;
   second discrimination means for discriminating a kind of a cartridge installed in said printing unit;
   warning means for giving a warning to a user of said image communication apparatus when a discrimination result of said first discrimination means does not correspond to a discrimination result of said second discrimination means; and
   printing control means for causing said printing unit to perform printing irrespective of a kind of the received image and the kind of cartridge, based on an instruction of the user, even when a warning is given by said warning means.

2. An apparatus according to claim 1, further comprising:
   a memory for storing the image received by said reception means; and
   storage control means for deleting image stored in said memory after printing is completed, when the printing was performed without said warning means giving a warning, and for inquiring the user about whether or not a stored image is to be deleted when printing was performed with said warning means giving a warning.

3. An apparatus according to claim 1, wherein, when it is discriminated by said second discrimination means that the cartridge was exchanged for a cartridge corresponding to a kind of the received image after said warning means gives a warning, said printing control means causes said printing unit to perform printing of the received image.

4. An apparatus according to claim 1, wherein, when it is discriminated by said first discrimination means that the received image is a monochrome image and it is discriminated by said second discrimination means that the cartridge is a cartridge for performing color printing of photograph image quality, said warning means gives a warning.

5. An apparatus according to claim 1, wherein, when it is discriminated by said first discrimination means that the received image is a color image and it is further discriminated by said second discrimination means that the cartridge is a cartridge for performing monochrome printing, said warning means gives a warning.

6. An apparatus according to claim 5, wherein said warning means inquires the user about whether or not a color image is to be converted into a monochrome image and then printed.

7. An apparatus according to claim 1, wherein, when it is discriminated by said first discrimination means that the received image is a color image and it is further discriminated by said second discrimination means that the cartridge is a cartridge for performing color printing of photograph image quality, said warning means gives a warning.

8. An image communication apparatus comprising:
   reception means for receiving an image, the image being a monochrome image or a color image;
   first discrimination means for discriminating whether the image received by said reception means is a monochrome image or a color image;
   a printing unit for printing the image received by said reception means, wherein a general color image printing cartridge and a photograph color image printing cartridge may be exchangeably installed in said printing unit;
   second discrimination means for discriminating a kind of a cartridge installed in said printing unit;
   memory substitute reception means for storing the image received by said reception means in a memory without automatically printing it, in a case where it is discriminated by said second discrimination means that a photograph color image printing cartridge has been installed in said printing unit and it is discriminated by said first discrimination means that the received image is a color image; and
   recording control means for enabling, in accordance with a user's instruction, recording of the image stored in the memory, using the photograph color image printing cartridge.

9. An apparatus according to claim 8, further comprising:

input means for inputting an instruction to print the image stored in the memory by said memory substitute reception means; and inquiring means for inquiring a user about whether the stored image is to be deleted from the memory after printing is performed based on the instruction from said input means.

10. A control method for an image communication apparatus that comprises a reception circuit for receiving an image, the image being a monochrome image or a color image, and a printing unit for performing monochrome printing or color printing of the image received by the reception circuit, wherein printing unit cartridges corresponding to kinds of images to be printed may be selectively and exchangeably installed in the printing unit, said method comprising:

a reception step of receiving an image by the reception circuit;

a first discrimination step of discriminating whether the image received in said reception step is a monochrome image or a color image;

a second discrimination step of discriminating a kind of cartridge installed in the printing unit;

a warning step of giving a warning to a user of the image communication apparatus when a discrimination result in said first discrimination step does not correspond to a discrimination result in said second discrimination step; and a print step of performing printing based on an instruction from the user, irrespective of a kind of the received image and the kind of cartridge, even when a warning is given in said warning step.

11. A method according to claim 10, further comprising:

a storage step of storing the image received in said reception step in a memory; and a deletion step of deleting the image stored in the memory after printing is completed when the printing was performed without giving a warning in said warning step, and inquiring the user about whether or not the stored image is to be deleted when the printing was performed with a warning given in said warning step.

12. A method according to claim 10, wherein, when it is discriminated that the cartridge was exchanged for a cartridge corresponding to a kind of the received image after a warning is given in said warning step, printing of the received image is performed.

13. A method according to claim 10, wherein, when it is discriminated in said first discrimination step that the received image is a monochrome image and it is further discriminated in said second discrimination step that the cartridge is a cartridge for performing color printing of photograph image quality, a warning is given in said warning step.

14. A method according to claim 10, wherein, when it is discriminated in said first discrimination step that the received image is a color image and it is further discriminated in said second discrimination step that the cartridge is a cartridge for performing monochrome printing, a warning is given in said warning step.

15. A method according to claim 14, wherein said warning step inquires the user about whether or not a color image is to be converted into a monochrome image and then printed.

16. A method according to claim 10, wherein, when it is discriminated in said first discrimination step that the received image is a color image and it is further discriminated in said second discrimination step that the cartridge is a cartridge for performing color printing of photograph image quality, a warning is given in said warning step.

17. A control method for an image communication apparatus that comprises a reception circuit for receiving an image, the image being a monochrome image or a color image, a printing unit for printing the image received by the reception circuit, wherein a general color image printing cartridge and a photograph color image printing cartridge may be exchangeably installed in the printing unit, and a memory, said method comprising:

a first discrimination step of discriminating whether the image received by the reception circuit is a monochrome image or a color image;

a second discrimination step of discriminating a kind of a cartridge installed in the printing unit;

a memory substitute reception step of storing the image received by the reception circuit in a memory without automatically printing it, in a case where it is discriminated in said second discrimination step that a photograph color image printing cartridge has been installed in the printing unit and it is discriminated in said first discrimination step that the received image is a color image; and a recording control step of enabling, in accordance with a user's instruction, recording of the image stored in the memory, using the photograph color image printing cartridge.

* * * * *

UNITED STATES PATENT AND TRADEMARK OFFICE

| | | |
|---|---|---|
| PATENT NO. | : 6,557,963 B1 | |
| DATED | : May 6, 2003 | |
| INVENTOR(S) | : Atsushi Ikeda | |

It is certified that error appears in the above-identified patent and that said Letters Patent is hereby corrected as shown below:

<u>Column 2,</u>
Line 9, "to" should read -- of --.
Line 14, "solved" should read -- solves --.

<u>Column 3,</u>
Line 34, "feds" should read -- feeds --.

<u>Column 4,</u>
Line 40, "carrying" should read -- carry --.

<u>Column 5,</u>
Line 57, "closely" should read -- close --.

<u>Column 7,</u>
Line 16, "structure-of" should read -- structure of --.

<u>Column 13,</u>
Line 10, "then" should read -- than --.

<u>Column 17,</u>
Line 31, "in" should read -- for --.

<u>Column 19,</u>
Line 67, "a" should be deleted.

<u>Column 20,</u>
Line 61, "such the ink" should read -- such ink --; and "are" should read -- is --.

Signed and Sealed this

Fourth Day of November, 2003

JAMES E. ROGAN
*Director of the United States Patent and Trademark Office*